US012693851B2

(12) United States Patent (10) Patent No.: US 12,693,851 B2

Lepe et al. (45) Date of Patent: Jul. 28, 2026

(54) DISTRIBUTED ROBOTIC PROCESSING AUTOMATION FLOW CORRECTIONS

(71) Applicant: Cerby, Inc., Alameda, CA (US)

(72) Inventors: Belsasar Lepe, Alameda, CA (US); Vidal Gonzalez, Guadalajara (MX); Carlos Arturo Ortiz Anaya, Mexico City (MX); David Rangel, Mexico City (MX)

(73) Assignee: Cerby, Inc., Alameda, CA (US)

( * ) Notice: Subject to any disclaimer, the term of this patent is extended or adjusted under 35 U.S.C. 154(b) by 208 days.

(21) Appl. No.: 18/496,678

(22) Filed: Oct. 27, 2023

(65) Prior Publication Data

US 2024/0143358 A1 May 2, 2024

Related U.S. Application Data

(60) Provisional application No. 63/420,441, filed on Oct. 28, 2022.

(51) Int. Cl.
G06F 8/70 (2018.01)
(52) U.S. Cl.
CPC ...................................... G06F 8/70 (2013.01)
(58) Field of Classification Search
None
See application file for complete search history.

(56) References Cited

U.S. PATENT DOCUMENTS

| | | | |
|---|---|---|---|
| 8,856,950 | B2 | 10/2014 | Kim et al. |
| 10,635,422 | B2 | 4/2020 | Falcy et al. |
| 10,684,839 | B2 | 6/2020 | Shuster et al. |
| 11,074,322 | B1 | 7/2021 | R. et al. |
| 2007/0038520 | A1 | 2/2007 | Grey et al. |
| 2008/0096485 | A1 | 4/2008 | Tobe et al. |
| 2011/0010244 | A1 | 1/2011 | Hatridge et al. |
| 2012/0216133 | A1 | 8/2012 | Barker et al. |
| 2014/0149920 | A1 | 5/2014 | Wang et al. |
| 2014/0165216 | A1 | 6/2014 | Kwag et al. |
| 2014/0195604 | A1 | 7/2014 | Wyatt et al. |
| 2015/0127774 | A1 | 5/2015 | Hitomi et al. |
| 2015/0161649 | A1 | 6/2015 | Eggleston et al. |
| 2016/0321452 | A1 | 11/2016 | Richardson et al. |
| 2019/0286474 | A1* | 9/2019 | Sturtivant ............... G06F 9/547 |

(Continued)

FOREIGN PATENT DOCUMENTS

WO        2024015481 A1        1/2024

OTHER PUBLICATIONS

International Preliminary Report on Patentability for International Application PCT/US2023/027563, Report issued Dec. 18, 2024, Mailed Jan. 30, 2025, 6 Pgs.

(Continued)

*Primary Examiner* — Qing Chen
(74) *Attorney, Agent, or Firm* — KPPB LLP

(57) ABSTRACT

Robotic process automation (RPA) bot flows may be modified in the event the RPA bot flows fail to successfully complete. The RPA bot flows may be modified based on user inputs, or the RPA bot flows may be modified based on similarities to other RPA bot flows that may include similar operations. In some embodiments determinations as to similarities to other RPA bot flows are made using a neural network. In some embodiments determinations as to similarities to other RPA bot flows are made using image analysis.

20 Claims, 16 Drawing Sheets

(56) References Cited

U.S. PATENT DOCUMENTS

| | | | |
|---|---|---|---|
| 2019/0286736 A1* | 9/2019 | Sturtivant | G06F 16/2358 |
| 2020/0089898 A1 | 3/2020 | Borkar et al. | |
| 2020/0147791 A1 | 5/2020 | Safary et al. | |
| 2021/0042126 A1* | 2/2021 | Perera | G06F 11/0772 |
| 2021/0334375 A1 | 10/2021 | Hu et al. | |
| 2021/0342216 A1 | 11/2021 | Dines | |
| 2021/0383005 A1 | 12/2021 | Varga et al. | |
| 2022/0035343 A1 | 2/2022 | Singh et al. | |
| 2022/0092607 A1 | 3/2022 | Jeske et al. | |
| 2022/0114044 A1 | 4/2022 | Singh | |
| 2022/0410398 A1* | 12/2022 | Sisley | G06N 20/00 |
| 2023/0046322 A1* | 2/2023 | Rastogi | G06F 9/451 |
| 2023/0050430 A1* | 2/2023 | Piau | G06F 9/5038 |
| 2023/0396622 A1 | 12/2023 | Martinez Lerin | |
| 2024/0020385 A1 | 1/2024 | Lepe et al. | |

OTHER PUBLICATIONS

International Preliminary Report on Patentability for International Application PCT/US2023/078097, Report issued Apr. 29, 2025, Mailed May 8, 2025, 5 Pgs.
International Search Report and Written Opinion for International Application No. PCT/US2023/027563, Search completed Nov. 1, 2023, Mailed Nov. 1, 2023, 9 Pgs.
International Search Report and Written Opinion for International Application No. PCT/US2023/078097, Search completed Feb. 20, 2024, Mailed Feb. 20, 2024, 7 Pgs.
Vasudevan et al., "Trustworthy Execution on Mobile Devices: What Security Properties Can My Mobile Platform Give Me?", Trust, 2012, pp. 1-19.

* cited by examiner

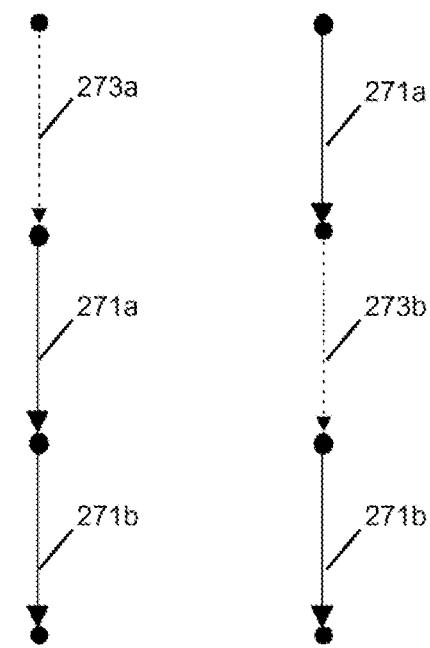
FIG. 2C          FIG. 2D

DISTRIBUTED ROBOTIC PROCESSING AUTOMATION FLOW CORRECTIONS

CROSS-REFERENCE TO RELATED APPLICATIONS

This application claims the benefit of U.S. Provisional Patent Application No. 63/420,441, filed on Oct. 28, 2022, the disclosure of which is incorporated by reference herein.

FIELD OF THE INVENTION

The present invention relates generally to robotic process automation (RPA) and more particularly to distributed correction of RPA processes.

BACKGROUND OF THE INVENTION

A variety of computer-implemented tasks require preliminary entry of various items of information prior to proceeding with the task itself. Other computer-implemented tasks merely require rote entry of data, with the person performing the task not needing to make determinations along the way as to what data should be entered once the task is defined.

Robotic process automation (RPA) may automate these and other tasks. In doing so, RPA may reduce labor time in performance of tasks. RPA may also reduce the drudgery imposed by such tasks, as well as increasing accuracy of data entry.

Unfortunately, the computer software underlying the tasks may change over time. This is often referred to as drift. Such changes may impact the data to be entered, or their order of entry. Moreover, associated system software may also change over time, for example requiring different or additional steps or information to be able to access the computer software. These changes may cause execution errors in RPA processes, with the RPA processes possibly entering incorrect data or, more likely, having the underlying computer software reaching an unexpected state not recognized by the RPA process.

BRIEF SUMMARY OF THE INVENTION

In some embodiments, upon an RPA process reaching an unexpected state, RPA flow corrections may be performed. The RPA flow corrections may be generated automatically and/or based on user inputs. In some embodiments a notification is provided to a user, requesting the user to perform actions desired for the RPA process. Inputs provided by the user are recorded. Upon completion of the user inputs, the user is requested to confirm correctness of the inputs, and, in response to receiving confirmation of correctness, the RPA process is adjusted to include the user inputs. In some embodiments, as more user inputs are captured, a Machine Learning engine can learn and anticipate user input changes as well. This allows for an accelerated path for updating RPA paths which may only require user review and approval. The user inputs, whether they are directly generated by users or by the Machine Learning engine, may be distributed for use in RPA processes performed for other users. In some embodiments the user inputs are adopted for use in RPA processes performed for the other users if the other users, or some predetermined subset of the other users, confirms correctness of the user inputs.

Some embodiments provide a method, performed by one or more processors, of updating a robotic process automation (RPA) bot flow, comprising: receiving an indication that an RPA bot performing RPA operations, in accordance with an RPA bot flow, encountered an exception; in response to receiving the indication that the RPA bot encountered an exception, determining further RPA operations that allow the RPA bot to complete RPA operations without an exception; and updating the RPA bot flow with the further RPA operations. In some embodiments determining further RPA operations that allow the RPA bot to complete RPA operations without an exception comprises: determining other RPA bot flows that are similar to the RPA bot flow at an operation that resulted in the exception; and determining portions of at least one of the other RPA bot flows that allow for completion of the RPA operations without an exception. In some embodiments other RPA bot flows that are similar to the RPA bot flow at the operation that resulted in the exception are determined based on visual similarities between at least portions of display images provided as part of the other RPA bot flows and at least a portion of a display image provided by the RPA bot flow at the operation that resulted in the exception. In some embodiments the exception comprises: comparing at least portions of display images provided as part of other RPA bot flows with at least a portion of a display image provided by the RPA bot flow at the operation that resulted in the exception. In some embodiments the comparing is performed by a neural network. In some embodiments the neural network has been trained to determine if portions of displays indicate a same data entry requirement. In some embodiments determining other RPA bot flows that are similar to the RPA bot flow at an operation that resulted in the exception comprises: determining, by a neural network, DOM elements indicated by at least a portion of a display image provided by the RPA bot flow at the operation that resulted in the exception and DOM elements indicated by at least portions of display images provided as part of other RPA bot flows; and determining similarities between the DOM elements indicated by at least a portion of a display image provided by the RPA bot flow at the operation that resulted in the exception and the DOM elements indicated by at least portions of display images provided as part of other RPA bot flows. In some embodiments determining portions of at least one of the other RPA bot flows that allow for completion of the RPA operations without an exception comprises: performing RPA operations of the at least one of the other RPA bot flows until the at least one of the other RPA bot flows completes without an exception; and determining that the executed RPA operations are the portions of the at least one of the other RPA bot flows that allow for completion of the RPA operations without an exception. In some embodiments the at least one of the other RPA bot flows comprises a single RPA bot flow. In some embodiments the at least one of the other RPA bot flows comprises multiple RPA bot flows. In some embodiments determining portions of at least one of the other RPA bot flows that allow for completion of the RPA operations without an exception comprises: performing RPA operations of a first of the other RPA bot flows until the RPA operations encounter an exception; determining yet other RPA bot flows that are similar to the first of the other RPA bot flows at an operation that resulted in the exception; and performing RPA operations of a first of the yet other RPA bot flows. In some embodiments determining further RPA operations that allow the RPA bot to complete RPA operations without an exception comprises: iteratively, until either RPA operations successfully complete or a maximum level is reached: determining RPA bot flows of a then-next level that are similar to an RPA bot flow at a then-current level at an operation that resulted in the exception, and performing RPA operations of a selected RPA bot flow at the then-next level until RPA operations of the selected RPA bot flow encounter an exception. In some embodiments the selected RPA bot flow at the then-next level is an RPA bot flow whose RPA operations have not yet been performed at the then-next level. In some embodiments the maximum level is a predetermined level. In some embodiments the maximum level is a level at which there are no RPA bot flows of a then-next level that are similar to an RPA bot flow at a then-current level at an operation that resulted in the exception. In some embodiments determining further RPA operations that allow the RPA bot to complete RPA operations without an exception comprises: commanding presentation on a display of a request to a user to perform data entry; and recording entries provided by the user.

These and other aspects of the invention are more fully comprehended upon review of this disclosure.

BRIEF DESCRIPTION OF THE DRAWINGS

FIGS. 2C-F are diagrams showing example addition, insertion, and branching modifications to RPA bot flows.

DETAILED DESCRIPTION

Figure 1:
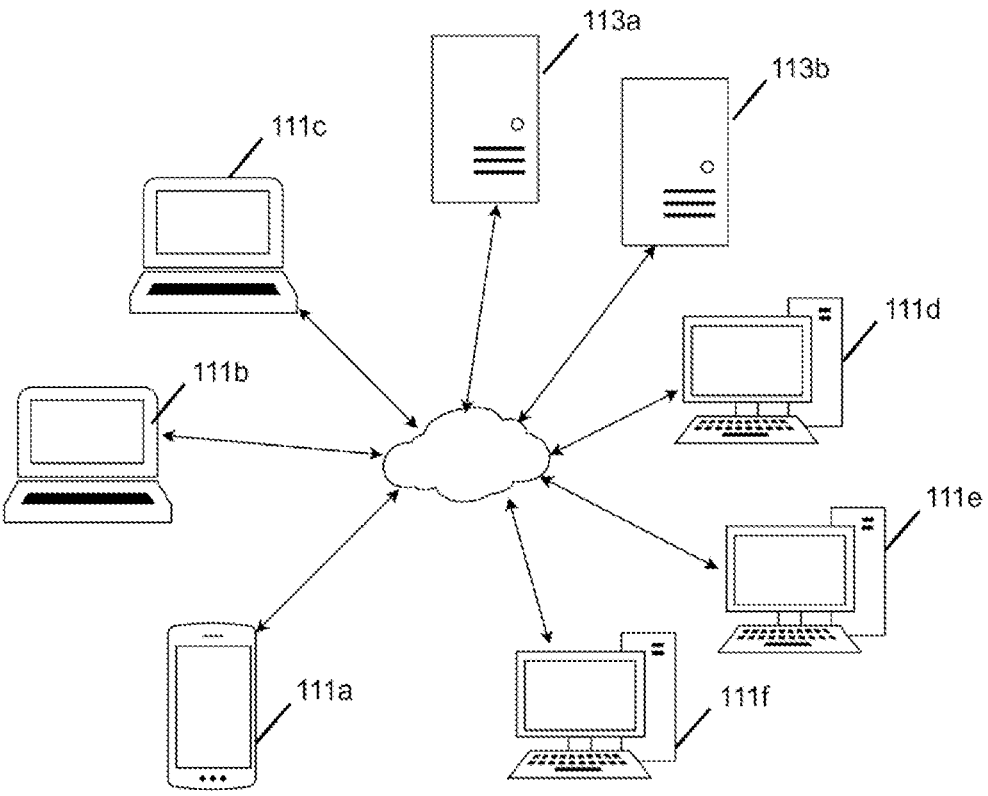
FIG. 1 is a semi-block diagram of a system including adjustment to robotic automation processes, in accordance with aspects of the invention.

FIG. 1 is a semi-block diagram of a system including adjustment to robotic automation processes. The system includes a plurality of user compute devices. The user compute device may include, for example, smartphones, for example, smartphone 111*a*, laptop computers, for example laptop computers 111*b,c*, and desktop computers, for example desktop computers 111*d-f*. In various embodiments the user compute device may include tablets and/or other computer devices used by users. The user compute devices generally include at least one processor, memory for storing data and program instructions, and network interface capabilities. The user compute devices generally either include a display and user input devices, or, as for example with desktop computers, have associated display and user input devices communicatively coupled to them.

The user compute devices are coupled by a network. The network may be or include, for example, the Internet. Also coupled to the network are servers, for example servers 113*a,b*. Although only two servers are illustrated in FIG. 1, the user compute devices may be coupled by the network to a large number of servers. In FIG. 1, a first server 113*a* of the servers may be a server providing for execution of application software, for example a software-as-a-service (SaaS) application. The SaaS server 113*a* should be considered a representative SaaS server, in most embodiments a large number of SaaS servers may be available. Also in FIG. 1, a second server 113*b* of the servers provides robotic process automation (RPA) services. In some embodiments the RPA services provided by the server include tracking and distribution of RPA bots to the user compute devices.

The user compute devices are generally configured to execute applications resident on the user compute devices, and/or request execution of applications resident on a server, for example server 113*a*. Execution of the applications may first require provision of various items of information to allow for access to the applications. For example, some applications may require receipt of a username (for example an email address), a password, a second factor code sent to a managed phone or email, and possibly other sundry information before access to the application is granted or before the tasks within the application are completed. Similarly, there may be various items of commonly used information used during execution. For example, bulk copying of information stored in a first location to a second location may routinely follow a preset pattern, as may, to an extent, provisioning or deprovisioning of a user, or a variety of other tasks. In all of these cases, entry of the information by a user of a user compute device may be tedious, possibly time-consuming, and possibly subject to errors that may lead to cybersecurity incidents.

The user compute devices are therefore configured to execute the RPA bots. In some embodiments the RPA bots are configured to provide information for a user to access and/or execute an application. In some embodiments the RPA bots are configured to provide provision of various items of information to allow for access to the applications. For example, in some embodiments the RPA bots are configured to provide entry of a username (for example an email address), a password, and possibly other sundry information which are to be entered to provide access to an application. Also, for example, in some embodiments the RPA bots are configured to copy or transfer information from a first location to a second location. In some embodiments the copied or transferred information may include one, some, or all of usernames, passwords, email addresses, multi-factor authentication (MFA) codes, text messages, and/or other information. Also, for example, in some embodiments the RPA bots may be configured to deprovision a user specified in a computer system. In some embodiments the RPA bot may be configured to modify settings for an application to reference or use information from other applications, or information derived or received from other devices. In doing so, for example, the bots effectively perform data input functions normally expected from the user.

In some embodiments the RPA bots may be scheduled to execute at preset times. In some embodiments the RPA bots may be configured to monitor operation of the user compute device, and to execute upon occurrence of a triggering event. In some embodiments the triggering event may be receipt of an input from a user requesting execution of an RPA bot. In some embodiments the user compute devices may include a component, or multiple components, involved in commanding execution of RPA bots and otherwise performing operations involved in monitoring operations of RPA bots. In some embodiments the component or components, or some of them, may execute on a server, instead of the user compute device. For simplicity, the component or components may be referred to as an RPA agent, recognizing that in various embodiments the RPA agent may be differently named. In some embodiments the RPA agent is configured to execute particular RPA bots at particular times or upon the occurrence of particular triggering events.

During execution of the RPA bots, the RPA bots may encounter unexpected states. The unexpected states may be states which result in halting of a normal flow of operation of the RPA bots. In some embodiments the unexpected state may be the user compute device being in a state in which a particular item of information is to be entered, an item of information which the RPA bot is not configured to provide. In some embodiments the unexpected state may be the user compute device being in a state in which an order of entry of information may be different than an order of entry of information for which the RPA bot is configured. In some embodiments the unexpected state involves the user compute device receiving an entry form having entry fields not matching entry fields of an entry form expected by the RPA bot. In some embodiments the unexpected state is the user compute device receives an identity challenge not expected by the RPA bot. The identity challenge may be, for example a challenge-response test, for example a request to enter a password, to enter a CAPTCHA response, or to enter a code sent to a particular contact point, which may be a separate device. In some embodiments the RPA bot may expect the user compute device to receive a particular web page, for example after completing an entry form, and the user compute device may not receive that web page. In some embodiments the RPA bot may expect to be able to obtain information from a particular location, application, and/or device, and the RPA bot may be unable to do so. In response to encountering such states, the RPA bot may issue an exception.

The RPA agent, or another component used in updating RPA bot flows, may receive the exception, or a notification of the exception, issued by the RPA bot, or an indication from another software module executing on the user compute device that the RPA bot issued the exception. In response to receiving the exception or indication that the exception issued, the RPA agent, or other component, is configured to modify a process flow of the RPA bot, such that the RPA bot may execute its process flow to completion.

In some embodiments the RPA agent, or other component, is configured to modify the RPA bot flow by incorporating portions of other RPA bot flow(s) into the RPA bot flow. In some embodiments the RPA agent, or other component, is configured to determine other RPA bot flows that have a similarity to the RPA bot flow, and to modify the RPA bot flow with portions of a selected one of the other RPA bot flows. In some embodiments the RPA agent, or other component, is configured to determine other RPA bot flows that have a similarity to the RPA bot flow, and to modify the RPA bot flow with portions of a selected one of the other RPA bot flows, and potentially iteratively determine still other RPA bot flows that have a similarity to the other RPA bot flows (or still other RPA bot flows, and to modify the RPA bot flow (or portions of other and still other RPA bot flows with portions of the other and still other RPA bot flows. In some embodiments the determination of other RPA bot flows that have a similarity to the RPA bot flow is based on a similarity to a point in the process flow of the RPA bot that gave rise to the exception. In some embodiments the selection of the selected one of the other RPA bot flows is determined by iteratively modifying the RPA bot with portions of the other RPA bot flows until a modified RPA bot flow executes to completion without an exception.

In some embodiment the RPA agent, or other component, is configured to determine other RPA bot flows that have a similarity to the RPA bot flow by performing comparisons of aspects of visual similarity of displayed pages occurring during execution of RPA bot flows. In some embodiments the RPA agent, or other component, is configured to determine aspects of visual similarity of a displayed page in the RPA bot flow that gave rise to the exception, and to determine other RPA bot flows which have pages with similar aspects. In some embodiments the RPA agent, or other component, maintains a library of displayed pages for RPA bot flows for use in such determinations. In some embodiments the aspects of the pages are DOM elements of the pages. In some embodiments the aspects of the pages are determined through an analysis of images of the pages. In some embodiments the analysis of the images of the pages is performed by a neural network that has been trained to identify the aspects of the pages. In some embodiments the neural network has been trained to identify DOM elements of the pages.

In some embodiments the RPA agent, or other component, makes use of user entries in modifying the RPA bot process flow. In some embodiments the RPA agent, or other component, is configured to provide a message to the user of the user compute device requesting assistance in modifying the RPA bot process flow, record user inputs to the user compute device for completing the RPA bot process flow, and modify the RPA bot process flow to use the recorded user inputs. In some embodiments the RPA agent, or other component, is additionally configured to provide a message to the user of the user compute device requesting annotation of the user inputs. For example, for each string of inputs provided by the user, the RPA agent, or other component, may request that the user also enter a description for the string of inputs. The description, for example, may indicate that the string of inputs is a username, a password, or some other item of information.

In some embodiments, the RPA agent, or other component, upon receiving the exception or indication that the exception issued, provides a message to the user of the user compute device. The message may, for example, indicate that assistance is needed for completing or performing the process flow of the RPA bot. The message may also include a link to an entry form in a sequence of entry forms.

Figure 2A:
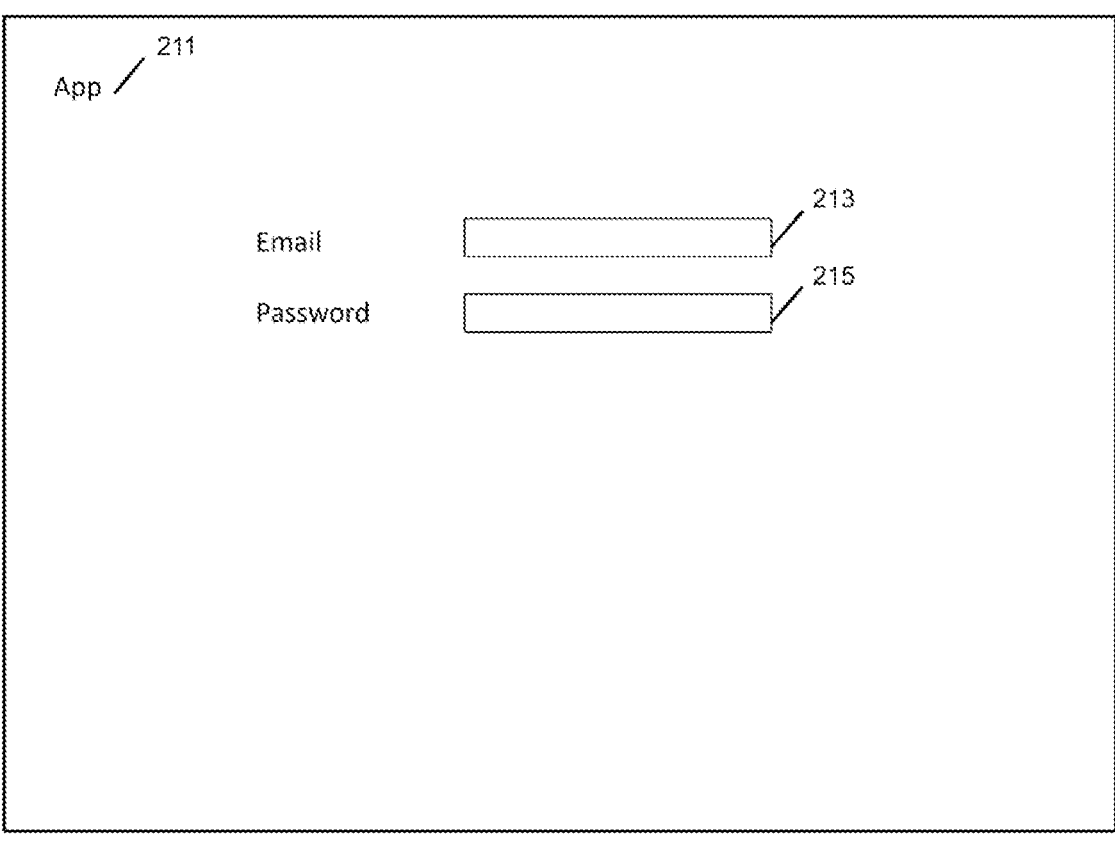
FIG. 2A is a screenshot of an example page with user entry fields.

FIG. 2A is a screenshot of an example page with user entry fields. Data entry for the user entry fields may be performed by an RPA bot. The example page of FIG. 2 is a log-in page for a software application. The screenshot of FIG. 2A includes a title 211 and a user log-in area including entry areas for a user name 213 and a password 215. In some embodiments, and as shown in FIG. 2A, the requested user name may be an email address or may require a Two-Factor authentication code (not shown in FIG. 2A).

Figure 2B:
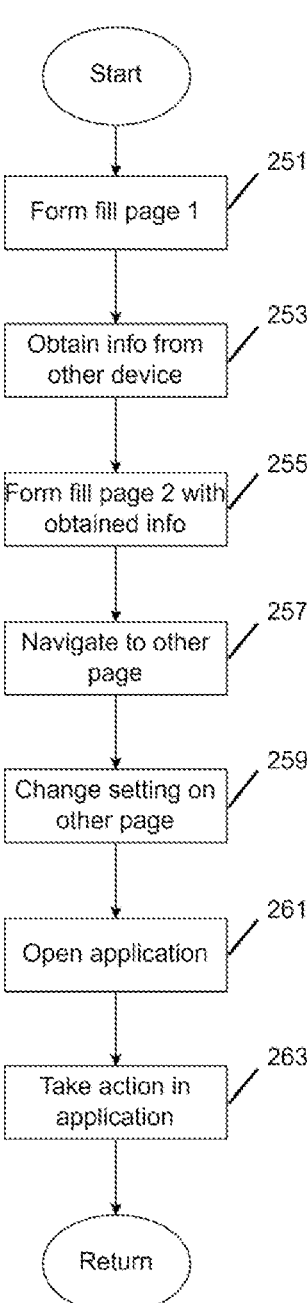
FIG. 2B is a flowchart showing an example RPA bot flow including multiple actions.

In many instances RPA bot operations may be significantly more complex than merely providing data entry for user entry fields. FIG. 2B is a flowchart showing an example RPA bot flow including multiple actions. The bot flow of FIG. 2B is merely an example, various other RPA bot flows, of greater or lesser complexity, may be performed. The process of the RPA bot flow may be performed by an RPA bot. The RPA bot may, for example, be triggered to execute by an RPA agent. In some embodiments the process of FIG.

2B is performed by a system, for example the system of FIG. 1. In some embodiments the process is performed by a user compute device, for example a user compute device of FIG. 1. In some embodiments the process is performed by one or more processors programmed by program instructions.

In block 251 the process enters data in user entry fields on a first page, which may be displayed on a display of a user compute device. The first page may be, for example, the log-in page of FIG. 2A. In some embodiments the loading of the first page, for example in a browser, may have caused an RPA agent to trigger execution of the process.

In block 253 the process obtains information from another device. The other device may be, for example, a managed phone number or email address, and the other information may be, for example, a verification code or second factor code. In some embodiments the other device may include application software allowing the other device to transfer information, including the verification code, over a network. In some embodiments the application software may cause transfer of the verification code to a server, which in turn is configured to cause transfer of the verification code to the user compute device, for use in the process.

In block 255 the process enters the information from the other device in a user entry field on a second page. The second page may be displayed on the display of the user compute device after display of the first page. The second page may be, for example, a page allowing for entry of a verification code.

In block 257 the process navigates to another page. The other page may be, for example, a page that allows for modifying settings of an application. The settings of the application may specify any number of aspects of operation of the application. For example, in some embodiments the settings may specify access settings for the application, a list of current application users and their access levels, run-time settings for execution of the application, and a variety of other items. In some embodiments, for example, the settings of the application may allow for specifying of an email address associated with a user of the application.

In block 259 the process changes a setting on the other page. In some embodiments the process may change a plurality of settings on the other page. In one embodiment, as an example, the process specifies a new email address associated with the user of the application. In some embodiments the new email address may be obtained from a database, a table, or other information structure correlating email addresses used by or for users. In some embodiments the new email address may be derived from an email address specified for the user on the other page, for example by changing a name portion of the email address and/or a domain of the email address in accordance with predetermined rules.

In block 261 the process opens an application. The application may be, for example, an application other than the application for which the setting was changed. In one embodiment, for example, the application is an email application.

In block 263 the process takes an action in the application. In some embodiments the process takes multiple actions in the application. For example, in one embodiment the process opens an email in the application (for example a most recent email) and enters a selection of a confirmation link in the email.

The process thereafter returns.

In some embodiments a process flow of an RPA bot, which may be referred to as an RPA flow or an RPA bot flow, may be considered to add to, subtract from, and/or provide branches to an RPA flow. FIGS. 2C-F are diagrams showing example addition, insertion, and branching modifications to RPA flows. FIG. 2C shows an RPA flow that may initially include a first operation 271a and a second operation, sequentially performed. The RPA flow may be modified to add a third operation 273a, to be performed prior to performing the first operation 271a. The RPA flow may be modified, for example, after the RPA bot attempting to execute the flow reaches an unexpected state, which may be specific to one user at a point in the RPA flow that the RPA bot attempts to perform the first operation. Such a situation may occur, for example, if a CAPTCHA entry is newly required, for example for a new user. In some embodiments a user is prompted to provide user inputs to re-create the entire RPA flow after the unexpected state is reached. In some embodiments, after the user enters one or more inputs, the RPA bot (or other component) checks to determine if an expected state has been reached, and, if so, continues performing operations of the RPA flow.

Alternatively, the RPA bot may be able to perform the first operation 271a, but reach an unexpected state thereafter. Such a situation may occur, for example, if information to be entered on a page is instead spread across multiple pages, if additional information (such as a two factor authentication) is required, for example for new logins, or if sub-level menu selections are newly required. In such a case, a third operation 273b may be inserted into the RPA flow between the first operation 271a and the second operation 271b.

Figures 2E, 2F:
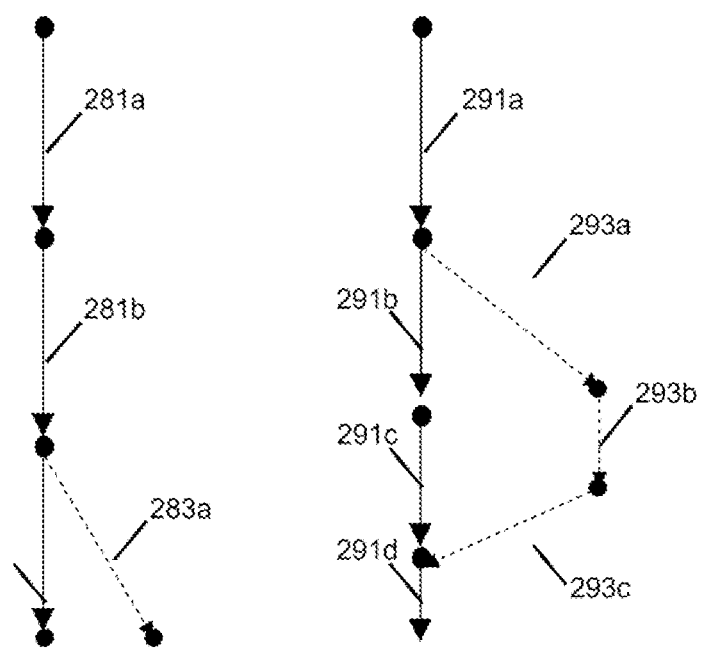

In some embodiments an RPA flow may be successful for some users, but unsuccessful for other users. For example, if a log-in flow is changed to provide for A/B testing, an RPA flow of successive operations 281a, 281b, and 281c may continue to be successful for a first set of users, but not a second set of users. FIG. 2E provides an example in which a third of the three successive operations is changed for the second set of users, and the RPA flow is modified to include a branch. The branch is provided by operation 283a, with either operation 281c or operation 283a performed. If the user compute device indicates a state expected for operation 281c to commence, operation 281c is performed. If the user compute device indicates a state expected for operation 283a to commence, operation 283a is performed.

The RPA flow modifications need not be comprised of single operation changes. For example, FIG. 2F shows an RPA flow which originally includes successive operations 291a, 291b, 291c, and 291d. The RPA flow may be modified to replace operations 291b and 291c with successive operations 293a, 293b, and 293c. Alternatively, in some embodiments the RPA flow may be modified such that operations 293a, 293b, and 293c are an alternative branch to operations 291b and 291c.

Figure 3A:
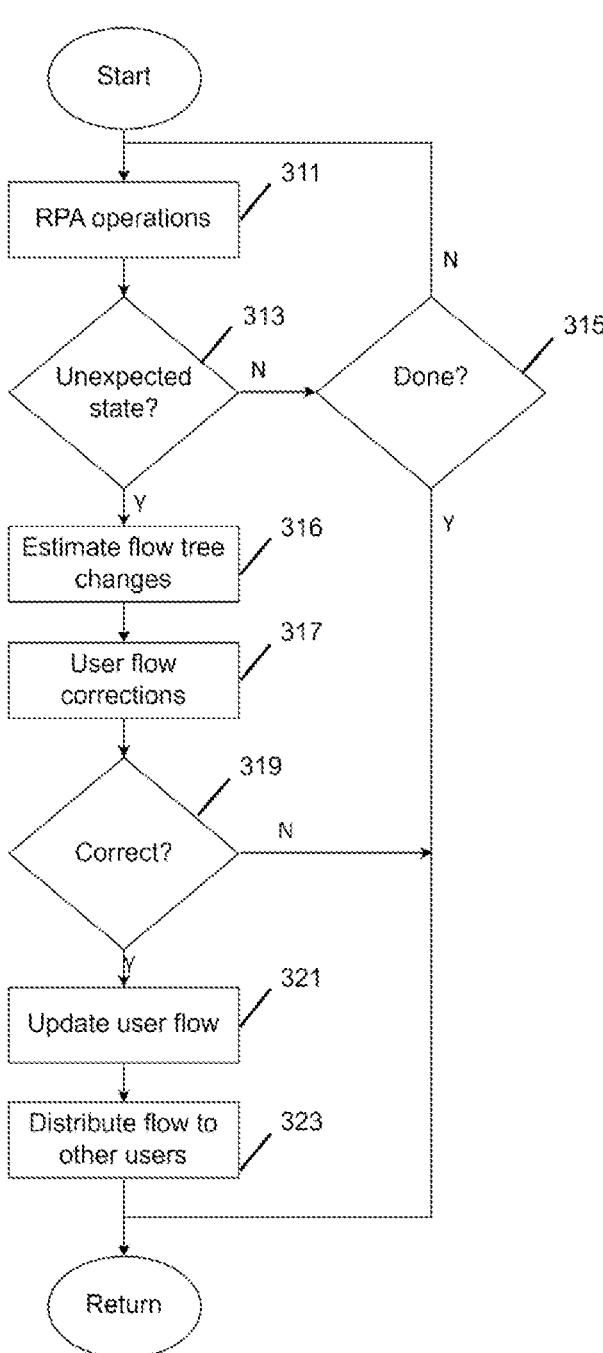
FIGS. 3A-D are flowchart processes including updating an RPA bot flow, in accordance with aspects of the invention.

FIG. 3A is a flowchart of a process including updating an RPA bot flow. The process of FIG. 3A makes use of user entries in updating the RPA bot flow. In some embodiments the process of FIG. 3A is performed by a system, for example the system of FIG. 1. In some embodiments the process is performed, at least in part, by a server, for example the server 113b of FIG. 1. In some embodiments the process is performed, at least in part, by a user compute device, for example a user compute device of FIG. 1. In some embodiments the process is performed by one or more processors programmed by program instructions.

In block 311 the process performs RPA bot functions. In some embodiments RPA bot functions may include recognizing a page or window including fields for user entries, and filling those fields with the appropriate data. In some embodiments the RPA bot functions instead or in addition include navigating to pages, opening applications, taking actions in applications, changing settings for applications, requesting and/or receiving information from other devices, and entering information from the other devices. Generally, the RPA bot functions are performed by an RPA bot. In most embodiments the RPA bot executes on a user compute device. In some embodiments the RPA bot follows an RPA flow in performing RPA bot functions. In some embodiments an RPA agent monitors pages and windows displayed on a user compute device for triggering conditions, for example the presence of particular pages or windows or the presence of particular fields for user entries, with the RPA agent triggering execution of a particular RPA bot for providing data for those fields. The RPA agent may also execute on the user compute device. In some embodiments the RPA bot executes as a background process, with the RPA bot monitoring pages and windows displayed on a user compute device, until such time as execution of the bot's RPA flow is triggered to provide data for user entry fields.

In block 313 the process determines if the RPA bot has reached an unexpected state. In some embodiments the process determines that the RPA bot reached an unexpected state based on a message from the RPA bot. In some embodiments the RPA bot may reach an unexpected state when user compute device pages or windows do not match expected user compute device pages or windows expected by the RPA flow being executed by the RPA bot. In some embodiments the RPA bot may reach an unexpected state when user entry form fields provided on the user compute device do not match expected user entry form fields expected by the RPA flow being executed by the RPA bot.

If the process determines that the RPA bot performing RPA bot functions has reached an unexpected state, the process goes to operations of block 316. If not, the process determines if RPA bot functions are complete in block 315. If so, the process returns; otherwise the process continues performing RPA bot functions in block 311.

In block 316 the process estimates RPA flow tree changes. In some embodiments the process compares information related to successfully performed operations of block 311 and information as to a display of the user compute device upon reaching the unexpected state with information of other RPA bot flows to determine potential changes to the RPA flow. In some embodiments the process uses results of the comparisons to estimate changes to the RPA flow. For example, in some embodiments the process uses results of the comparisons to determine if pre-cursor, post-cursor, or branching operations are to be added to the RPA flow. In some embodiments, for example, the pre-cursor, post-cursor, or branching operations may be as discussed with respect to FIGS. 2C-F, or the many variations and permutations thereof. In some embodiments the process attempts to carry out operations of the other RPA bot flows, or one of the other RPA bot flows, in the hope that carrying out those operations will resolve the condition leading to the unexpected state. In some embodiments the process may be considered as having returned to operations of block 311 in the carrying out of those operations. In some embodiments the process may be considered as performing the operations of block 317 in carrying out of those operations, without, in some embodiments, the need for receiving RPA flow corrections from the user.

In block 317 the process receives RPA flow corrections. In some embodiments the process receives the RPA flow corrections by way of user input to the user compute device. In some embodiments the RPA flow corrections comprise the data to be entered in the user entry form fields. In some embodiments the RPA flow corrections instead or in addition comprise information indicating the data to be entered in the user entry form fields. In some embodiments the process provides a message to the user of the user compute device, for example by way of display of a message on the user compute device, requesting that the user enter data to complete operations to fill in user data entry fields. In some embodiments the process records the data entered in the user data entry fields. In some embodiments the process examines the data entry field and determines a proposed entry for the data entry field (for example using machine learning algorithms) and, in some embodiments, presents the proposed entry for the user for approval. In some embodiments the process presents to the user, for example by way of the display of the user compute device, a request that the user provide an indication of the type of data entered in each of the user entry form fields. In some embodiments the process records the indication of the type of data entered in each of the user entry form fields. In some embodiments the process begins RPA flow corrections at the point in the RPA flow process at which the RPA bot reached an unexpected state. In some embodiments the process begins RPA flow corrections at a beginning of the RPA flow for the RPA bot. In some embodiments the process provides for RPA flow corrections only for those operations which are estimated to be changes in the RPA flow. In some embodiments, the user specifies a message sent to a managed contact point (email or phone number) and provides logic to parse the message to provide the extracted code to the RPA flow.

In block 319 the process determines if the RPA flow corrections are correct. In some embodiments the RPA flow corrections are the RPA flow corrections of blocks 316 and/or 317. In some embodiments the process determines that the RPA flow corrections are correct based on receiving a user compute device input from the user that the RPA flow corrections are correct. In some embodiments the process presents to the user, for example by way of a display on the user compute device, a request to confirm that the RPA flow corrections are complete. In some embodiments the process determines that RPA flow corrections are correct based on the process determining that the RPA form filling process is complete. In some embodiments the process determine the RPA flow corrections are correct based on a previously defined success state being reached (e.g., a login page or visual modal feedback rendered by the underlying application being presented on the display of the user compute device).

In block 321 the process updates the RPA flow for the RPA bot for the user. In some embodiments the process modifies the RPA flow for the RPA bot to provide for operations as provided by the user. In some embodiments the process modifies the RPA flow for the RPA bot to provide entry of the data entered by the user for each of the user entry form fields. In some embodiments the process modifies the RPA flow for the RPA bot to provide for entry of the type of data indicated by the user for each of the user entry form fields.

In block 323 the process distributes the updated RPA flow for the RPA bot to other users. In some embodiments the process distributes the updated RPA flow for the RPA bot by sending the updated RPA flow to other user compute devices. In some embodiments the process sends the updated RPA flow to the other user compute devices in order to determine if a success state is achieved. In some embodiments the process distributes the updated RPA flow for the RPA bot to other user compute devices in a staged manner. In some embodiments the process sends the updated RPA flow in a staged manner in order to determine if the success state is achieved. For example, in some embodiments the process first distributes the updated RPA flow for the RPA bot to a first set of user compute devices associated with a first set of users, and then later distributes the updated RPA flow for the RPA bot to still other user compute devices associated with further sets of users. In some embodiments checking in both cases to see if the success state is achieved. In some embodiments the process distributes the updated RPA flow for the RPA bot to the still other user compute devices after the first set of users, or a predetermined number of the first set of users, confirm correctness of the updated RPA flow for the RPA bot, for example as determined by reaching the success state.

The process thereafter returns.

Figure 3B:
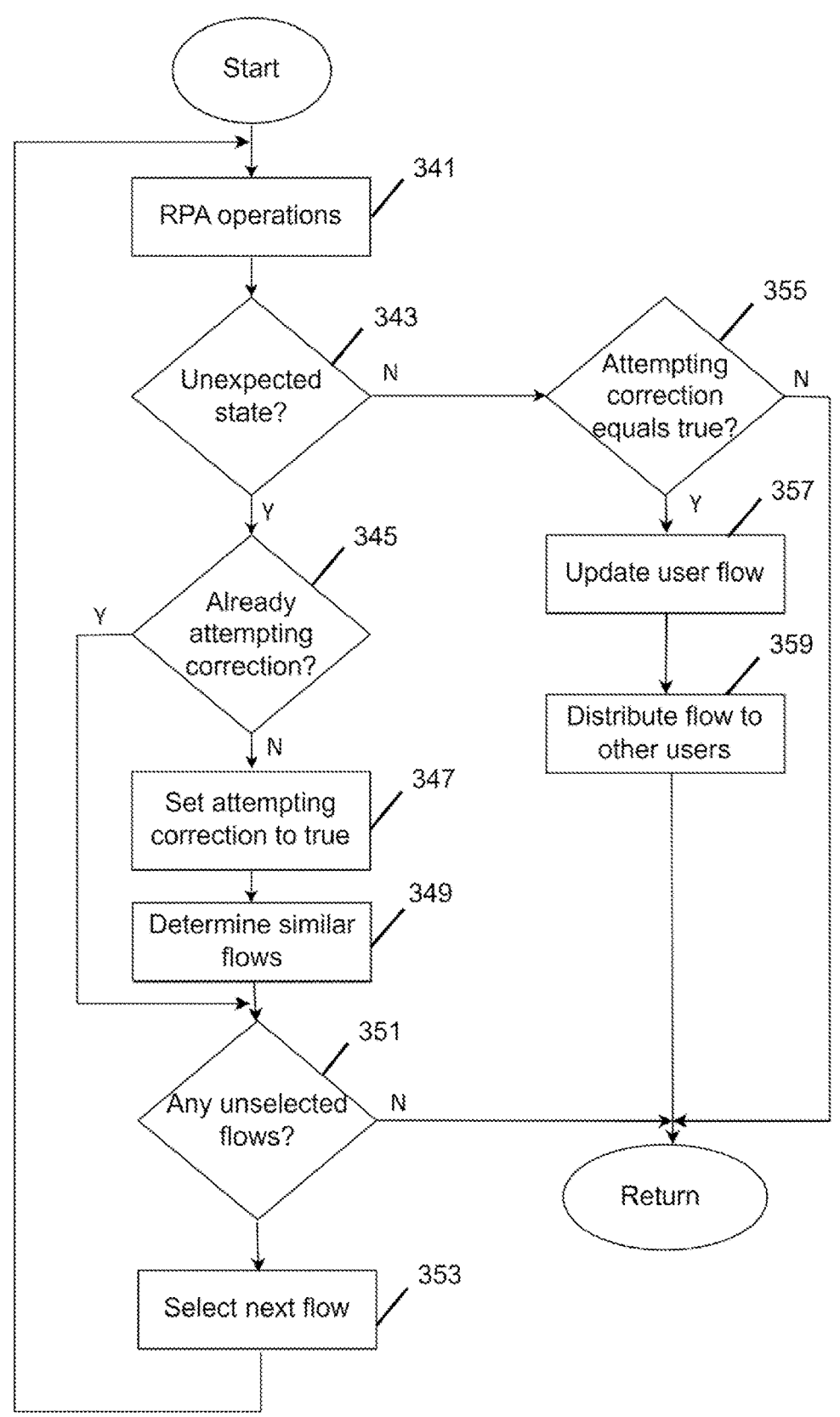

FIG. 3B is a flowchart of a process including updating an RPA bot flow. The process of FIG. 3B makes use of other RPA bot flows in updating the RPA bot flow. The process of FIG. 3B may be considered to make use of only a single level of other RPA bot flows in updating the RPA bot flow. The single level of other RPA bot flows may be other RPA bot flows that have a similarity to the RPA bot flow at a position in the RPA bot flow generating an unexpected state. In some embodiments the process of FIG. 3B is performed by a system, for example the system of FIG. 1. In some embodiments the process is performed, at least in part, by a server, for example the server 113*b* of FIG. 1. In some embodiments the process is performed, at least in part, by a user compute device, for example a user compute device of FIG. 1. In some embodiments the process is performed by one or more processors programmed by program instructions.

In block 341 the process performs RPA bot functions. In some embodiments the process performs RPA bot functions as discussed with respect to block 311 of the process of FIG. 3A. In addition, if attempting correction is true, the process additionally records, or maintains records of performed RPA bot functions for a page that does not result in an exception indicating an unexpected state.

In block 343 the process determines if the RPA bot has reached an unexpected state. In some embodiments the process determines if the RPA bot has reached an unexpected state as discussed with respect to block 313 of the process of FIG. 3A. If the process determines that the RPA bot performing RPA bot functions has reached an unexpected state, the process goes to operations of block 345. If not, for example if the RPA bot functions complete to a successful conclusion, the process goes to operations of block 355. If, in block 355, the process determines that attempts to correct the RPA bot flow are not being made, the process returns.

In block 355, the process determines if the process is already attempting correction of the RPA bot flow. If not, the process performs operation of block 347 and 349, and then continues to block 351. If the process is already attempting correction of the RPA bot flow, the process proceeds directly to block 351.

In block 347 the process sets a flag indicating an attempt to correct the RPA bot flow is being undertaken.

In block 349 the process identifies other RPA bot flows that include pages that are the same as, or in some embodiments similar to, the page of the RPA bot flow that resulted in the unexpected state. In some embodiments the process identifies the other RPA bot flows by determining similarities, in some embodiments visual similarities, between at least portions of the page of the RPA bot flow that resulted in the unexpected state and at least portions of pages of other RPA bot flows. In some embodiments the process identifies the other RPA bot flows by determining visual similarities between at least portions of the page of the RPA bot flow that resulted in the unexpected state and at least portions of pages of other RPA bot flows. In some embodiments the visual similarities are determined using a neural network. In some embodiments the neural network has been trained to identify data entry fields in images of a display. The image may be, for example, a screenshot of the display, or of a window of the display. In some embodiments the process identifies the other RPA bot flows by determining similarities in DOM elements between the page of the RPA bot flow that resulted in the unexpected state and DOM elements of pages of other RPA bot flows. In some embodiments the process determines the DOM elements using a neural network trained to identify DOM elements in images of a display.

In block 351 the process checks to see if there are any other RPA bot flows to process. If not, the process returns. Otherwise the process continues to block 353.

In block 353 the process selects a next other RPA bot flow to use for RPA bot operations. The other RPA bot flows may be arranged in a sequence, for example, with successive ones of the other RPA bot flows selected for use.

The process then returns to performing RPA bot operations in block 341 using the next other RPA bot flow. The performed RPA bot operations may, for example, begin at a point in the next other RPA bot flow that is responsive to the page in the next other RPA bot flow that is similar to the page in the RPA bot flow that resulted in the unexpected state.

If the next other RPA bot flow encounters an unexpected state, the process continues to select further next other RPA bot flows and perform RPA bot operations until either the RPA bot operations complete successfully or there are no more other RPA bot flows to attempt. In some embodiments the process may, in-between performing operations of other RPA bot flows, perform operations to reset a state of a user computer to a point in the (original) RPA bot flow giving rise to the exception. If there are no more other RPA bot flows to attempt, the process returns.

If the process successfully completes the RPA operations, no unexpected state occurred and the process goes to operations of block 355. In block 355, the process determines if the process has been attempting to correct the RPA bot flow. As mentioned above, if not, the process returns. If the process has been attempting to correct the RPA bot flow, the process corrects the RPA bot flow in 357. In correcting the RPA bot flow, the process modifies the RPA bot flow to include those portions of the other RPA bot flow that resulted in successful completion of the flow.

In block 359, the process distributes the modified RPA bot flow to other users. In some embodiments the process may not be distributed until the modified RPA bot flow has been verified as correct, for example by a human subject matter expert.

The process thereafter returns.

Figure 3C:
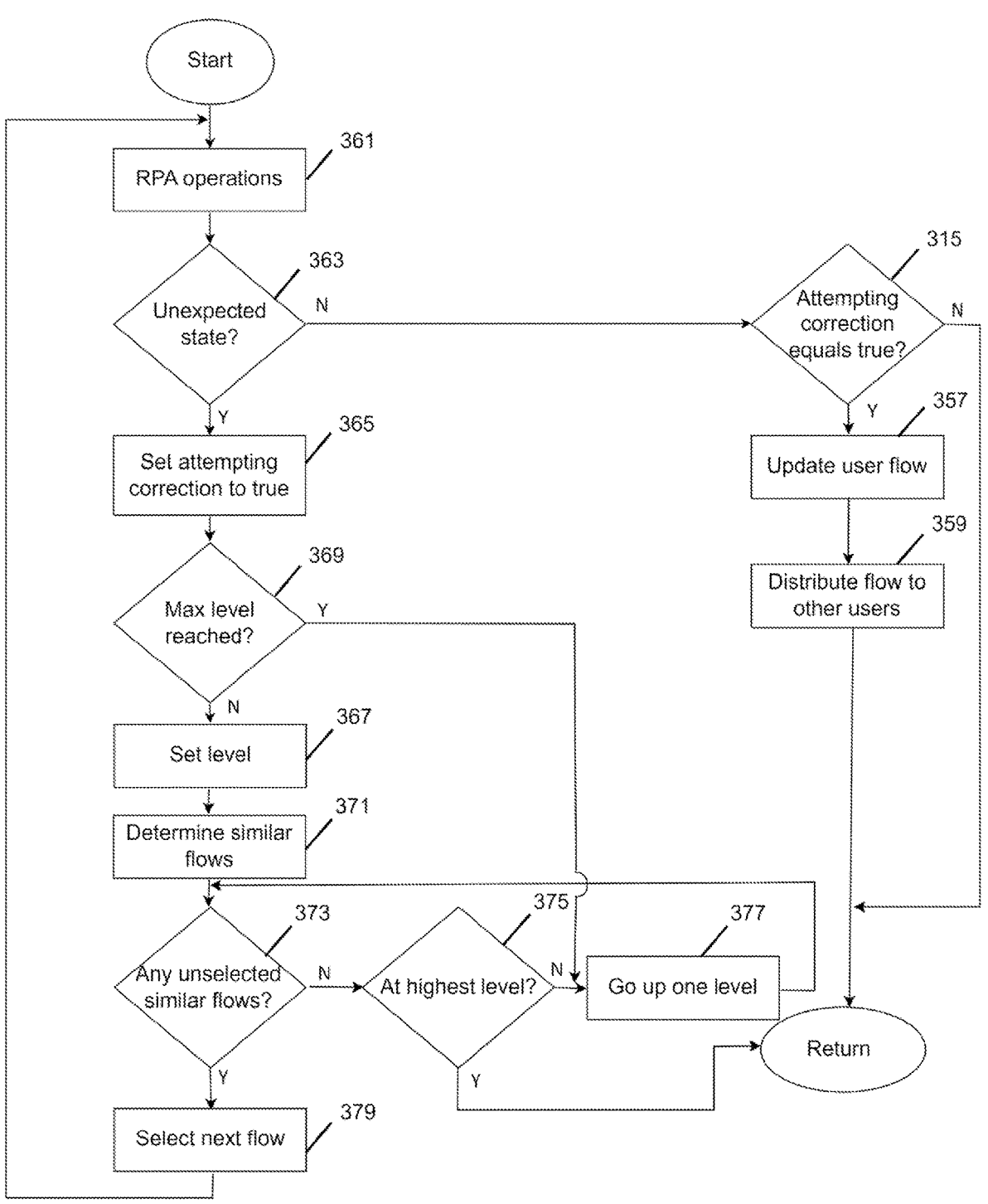

FIG. 3C is a flowchart of a process including updating an RPA bot flow for a user. The process of FIG. 3C makes use of other RPA bot flows in updating the RPA bot flow. The process of FIG. 3C may be considered to potentially iteratively make use of multiple levels of other RPA bot flows in updating the RPA bot flow. For example, the process of FIG. 3C may make use of a first other RPA bot flow that has a similarity to the RPA bot flow at a position in the RPA bot flow generating an unexpected state, and then make use of a second other RPA bot flow in the event that the first other RPA bot flow encounters an unexpected state. In some embodiments the process of FIG. 3C is performed by a system, for example the system of FIG. 1. In some embodiments the process is performed, at least in part, by a server, for example the server 113*b* of FIG. 1. In some embodiments the process is performed, at least in part, by a user compute device, for example a user compute device of FIG. 1. In some embodiments the process is performed by one or more processors programmed by program instructions.

In block 361 the process performs RPA bot functions. In some embodiments the process performs RPA bot functions as discussed with respect to block 311 of the process of FIG. 3A. In addition, if attempting correction is true, the process additionally records performed RPA bot functions for a page that does not result in an exception indicating an unexpected state.

In block 363 the process determines if the RPA bot has reached an unexpected state. In some embodiments the process determines if the RPA bot has reached an unexpected state as discussed with respect to block 313 of the process of FIG. 3A.

If the process determines that the RPA bot performing RPA bot functions has reached an unexpected state, the process goes to operations of block 365. If not, the process goes to operations of block 355, and performs post-RPA bot operations processing.

In block 365 the process sets a flag indicating that the process is attempting to correct the RPA bot flow, and thereafter attempts to correct the RPA bot flow in an iterative manner. In short, the process attempts to correct the RPA bot flow by determining other similar RPA bot flows at a point in the RPA bot flow causing the unexpected state, performing operations of those similar RPA bot flows until either a further unexpected state is reached (in which case the process is repeated) or the RPA operations successfully complete. In doing so, the process may be considered to be traversing from root to leaf a tree whose nodes are the similar RPA bot flows, until either all of the nodes are exhausted or the RPA operations successfully complete. In some embodiments the tree is limited to a maximum root-to-leaf depth.

In the embodiment of FIG. 3C, after determining that the RPA bot flow has reached an unexpected state, the process sets a flag indicating that the process is attempting to correct the RPA bot flow to true in block 365. The process in block 367 sets a level for the attempted correction. During an attempted correction, the level will be initially set to a first level. If, during the correction process, the level is incremented if a further unexpected state is reached. The level indicates a number of other RPA bot flows that are being used sequentially to attempt to correct the RPA bot flow. In various embodiments the flag and the level may not be explicitly set, or even implicitly set, with the process making use of other methods to accomplish decisions dependent on those items.

In block 369 the process determines if a maximum level has been reached. In some embodiments the process will iteratively attempt to correct the RPA bot flow with only a predetermined sequential number of other RPA bot flows. If the maximum level has been reached, the process goes to block 377 and decrements the level. If the maximum level has not been reached, the process continues to block 371.

In block 371 the process identifies other RPA bot flows that include pages that are the same as, or in some embodiments similar to, the page of the RPA bot flow that resulted in the unexpected state. In some embodiments the similarities are visual similarities. In some embodiments the process identifies the other RPA bot flows by determining similarities between at least portions of the page of the RPA bot flow that resulted in the unexpected state and at least portions of pages of other RPA bot flows. In some embodiments the process identifies the other RPA bot flows by determining visual similarities between at least portions of the page of the RPA bot flow that resulted in the unexpected state and at least portions of pages of other RPA bot flows. In some embodiments the visual similarities are determined using a neural network. In some embodiments the neural network has been trained to identify data entry fields in images of a display. In some embodiments the process identifies the other RPA bot flows by determining similarities in DOM elements between the page of the RPA bot flow that resulted in the unexpected state and DOM elements of pages of other RPA bot flows. In some embodiments the process determines the DOM elements using a neural network trained to identify DOM elements in images of a display.

In block 373 the process determines if there are any other RPA bot flows to process at the then current level. There may not be any other RPA bot flows to process at a level for a variety of reasons. For example, no similar other RPA bot flows may have been determined in block 371, or execution of all of the similar other RPA bot flows at that level may already have been attempted. If there are no similar other RPA bot flows to process at the then current level, the process in block 375 determines if the process is at the highest level (e.g., the first level). If so, the process returns. If not, the process goes to block 377 and goes up one level (e.g., decrements the level). The process would then continue back to operations of block 373 to determine if there are any other RPA bot flows to process at the new current level.

In block 379 the process selects a next other RPA bot flow to use for RPA operations. The other RPA bot flows for a level may be arranged in a sequence, for example, with successive ones of the other RPA bot flows selected for use.

The process then returns to performing RPA operations in block 361 using the selected next other RPA bot flow. The performed RPA operations may, for example, begin at a point in the next other RPA bot flow that is responsive to the page in the next other RPA bot flow that is similar to the page in the RPA bot flow that resulted in the unexpected state.

If the next other RPA bot flow encounters an unexpected state, the process continues to proceed as discussed above, selecting further next other RPA bot flows and recursively performing RPA operations until either the RPA operation complete successfully, or there are no more other RPA bot flows to attempt. In some embodiments the process may, in-between performing operations of other RPA bot flows at a same level, perform operations to reset a state of a user computer to a point in the (original) RPA bot flow giving rise to the exception.

As mentioned earlier, if RPA operations successfully complete, the process performs post-RPA bot processing operations. In block 315 the process determines if the process was not attempting to correct the RPA bot flow, the process returns. If the process was attempting to correct the RPA bot flow, process corrects the RPA bot flow in 357. In correcting the RPA bot flow, the process modifies the RPA bot flow to include those portions of the other RPA bot flows that resulted in successful completion of the flow. In block 359, the process distributes the modified RPA bot flow to other users. In some embodiments the process may not be distributed until the modified RPA bot flow has been verified as correct, for example by a human subject matter expert.

The process thereafter returns.

Figure 3D:
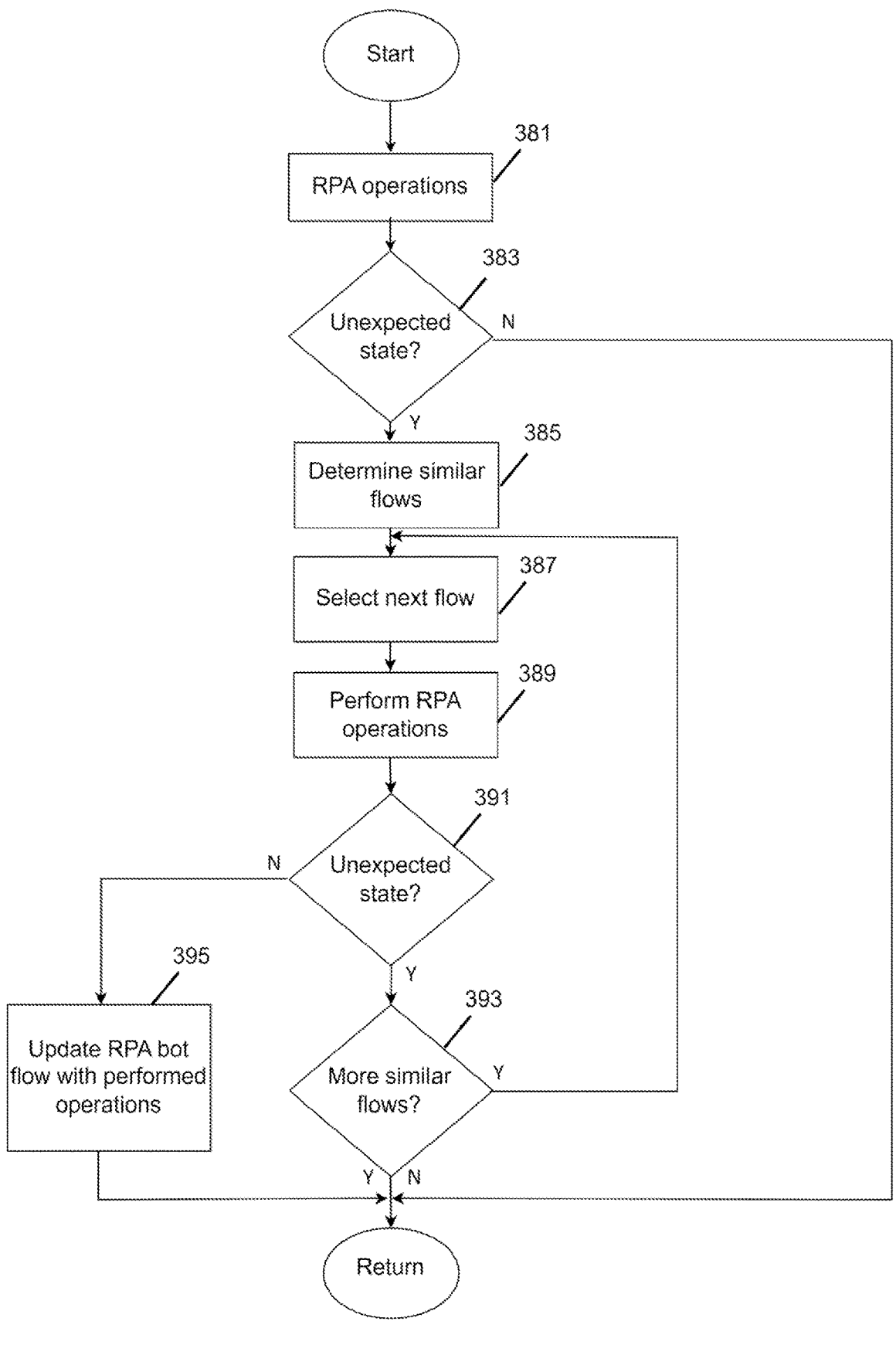

FIG. 3D is a flowchart of a process including updating an RPA bot flow. The process of FIG. 3D makes use of other RPA bot flows in updating the RPA bot flow. The process of FIG. 3D may be considered to make use of only a single level of other RPA bot flows in updating the RPA bot flow. The single level of other RPA bot flows may be other RPA bot flows that have a similarity to the RPA bot flow at a position in the RPA bot flow generating an unexpected state. Moreover, the process of FIG. 3D performs updates of the RPA bot flow using operations from only a single other RPA bot flow. In some embodiments the process of FIG. 3B is performed by a system, for example the system of FIG. 1. In some embodiments the process is performed, at least in part, by a server, for example the server 113*b* of FIG. 1. In some embodiments the process is performed, at least in part, by a user compute device, for example a user compute device of FIG. 1. In some embodiments the process is performed by one or more processors programmed by program instructions.

In block 381 the process performs RPA bot functions. In some embodiments the process performs RPA bot functions as discussed with respect to block 311 of the process of FIG. 3A.

In block 383 the process determines if the RPA bot has reached an unexpected state. In some embodiments the process determines if the RPA bot has reached an unexpected state as discussed with respect to block 313 of the process of FIG. 3A. If the process determines that the RPA bot performing RPA bot functions has reached an unexpected state, the process goes to operations of block 385. If not, for example if the RPA bot functions complete to a successful conclusion, the process returns.

In block 385 the process identifies other RPA bot flows that include pages that are the same as, or in some embodiments similar to, the page of the RPA bot flow that resulted in the unexpected state. In some embodiments the process identifies the other RPA bot flows by determining similarities, visual similarities in some embodiments, between at least portions of the page of the RPA bot flow that resulted in the unexpected state and at least portions of pages of other RPA bot flows. In some embodiments the process identifies the other RPA bot flows by determining visual similarities between at least portions of the page of the RPA bot flow that resulted in the unexpected state and at least portions of pages of other RPA bot flows. In some embodiments the visual similarities are determined using a neural network. In some embodiments the neural network has been trained to identify data entry fields in images of a display. The image may be, for example, a screenshot of the display, or of a window of the display. In some embodiments the process identifies the other RPA bot flows by determining similarities in DOM elements between the page of the RPA bot flow that resulted in the unexpected state and DOM elements of pages of other RPA bot flows. In some embodiments the process determines the DOM elements using a neural network trained to identify DOM elements in images of a display.

In block 387 the process selects a next other RPA bot flow to use for RPA operations. The other RPA bot flows for a level may be arranged in a sequence, for example, with successive ones of the other RPA bot flows selected for use.

In block 389 the process performs RPA bot functions of the next other RPA flow. In some embodiments the process performs RPA bot functions as discussed with respect to block 311 of the process of FIG. 3A.

In block 913 the process determines if the next other RPA bot has reached an unexpected state. In some embodiments the process determines if the RPA bot has reached an unexpected state as discussed with respect to block 313 of the process of FIG. 3A. If the process determines that the RPA bot performing RPA bot functions has reached an unexpected state, the process goes to operations of block 387 and selects a new next other RPA bot flow. In some embodiments, if there are no next other RPA bot flows to select, the process returns. In some embodiments the process also resets a state of a user computer to a point in the original RPA bot flow that gave rise to the exception. If not, the process goes to block 395.

In block 395 the process updates the RPA bot flows with the successfully completed operations of the next other RPA bot flow.

The process thereafter returns.

Figure 4:
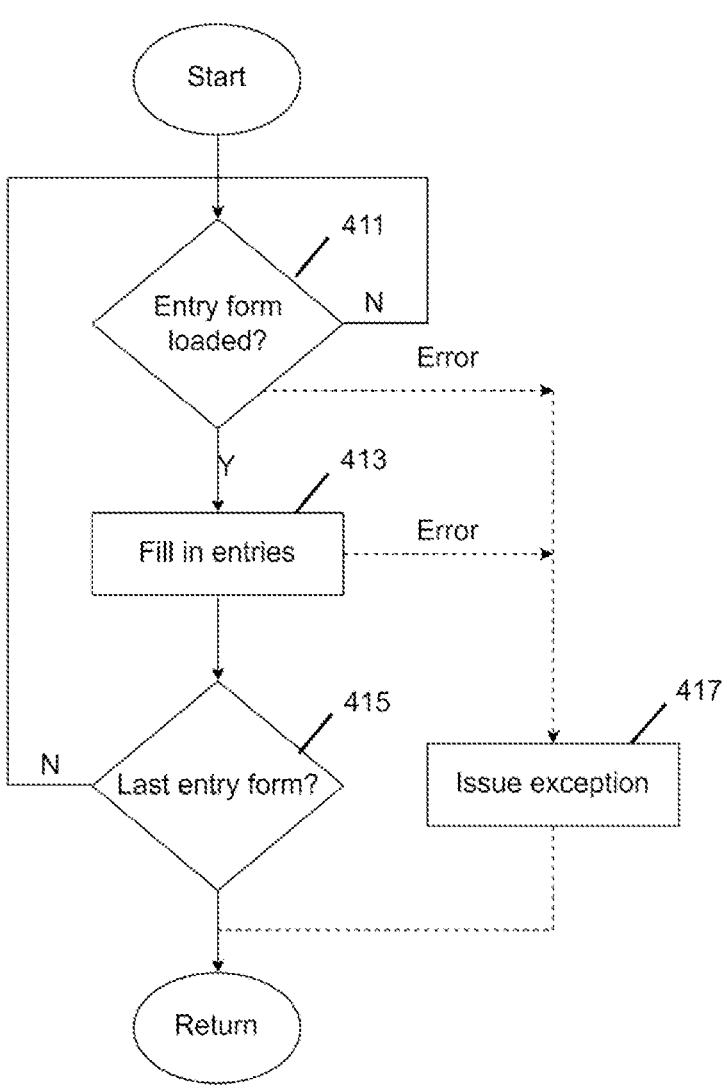
FIG. 4 is a flowchart of a simplified process illustrating example RPA bot operations.

FIG. 4 is a flowchart of an example process including filling of a form by an RPA bot, including possible issuance of an exception. In various embodiments the RPA bot may perform functions more complex than merely filling of the form, and performance of those functions may lead to issuance of an exception, for example for reasons mentioned herein. In some embodiments the process performs the operations of block 311 of the process of FIG. 3A, block 341 of FIG. 3B, and block 361 of FIG. 3C. In some embodiments the process of FIG. 4 is performed by a system, for example the system of FIG. 1. In some embodiments the process is performed, at least in part, by a user compute device, for example a user compute device of FIG. 1. In some embodiments the process is performed by one or more processors programmed by program instructions.

In block 411 the process determines if an entry form has been loaded. In some embodiments the process determines if an entry form is a particular entry form. In some embodiments the process determines if the entry form has been loaded based on presence of user entry form fields in a window or page displayed on a user compute device. In some embodiments the process determines if an entry form has been loaded based on other information of or for the window or page. In some embodiments the RPA bot determines if the entry form has been loaded. In some embodiments, particularly for example for a first entry form in a sequence of entry forms, an RPA agent may determine if the entry form has been loaded, for example to trigger operations of the RPA bot.

In block 413 the process fills in entries in the entry form. Generally, the RPA bot fills in entries of the entry form. In some embodiments the process fills in entries using information stored on the user compute device. In some embodiments the process fills in entries based on information of an RPA flow for the RPA bot. In some embodiments the RPA flow indicates a location of information to be used to fill in the entries. In some embodiments a data structure associated with the RPA flow indicates the location of information to be used to fill in the entries. In some embodiments a data structure associated with the RPA flow includes the information to be used to fill in the entries. In some embodiments, data from an associated contact point (email or phone number) is parsed and entered into an entry form. In some embodiments the information is received from another device.

In block 415 the process determines if the last entry form in a sequence of entry forms has been filled. If so, the process returns. Otherwise, the process goes to block 411 to determine if a further entry form has been loaded.

During operations of block 411 and/or block 413, an error may occur. The error may take the form of the sequence of entry forms, or particular user entry fields for an entry form, being other than expected by the RPA flow for the RPA bot. For example, a log-in flow may be changed by a software provider or service to provide for separate windows or pages for user name and password, instead of a single page allowing for entry of both items. Similarly, a software provider or service may add an additional step to a log-in procedure, for example as part of a two-factor authentication process. Also, for example, user provisioning or de-provisioning flows may be changed by the software provider or service, in which case possibly a sequence of entry forms and particular user entry fields may be changed. Moreover, locations of and/or options for changing of settings may be changed, or any of a variety of changes may have occurred that result in the RPA bot reaching an unexpected state. In the event of an error, the process in block 417 issues an exception. In some embodiments the exception may be considered to indicate that the RPA bot has reached an unexpected state or a known and supported error state (e.g., the software provider or service is unavailable due to an outage). After issuing the exception, the process returns. In some embodiments, responsive to issuance of the exception, the RPA flow is revised in accordance with user inputs and/or automatically, for example as discussed herein. In some embodiments, the RPA bot (rather than some other component) may be configured to automatically revise the RPA flow, without a need to issue the exception.

Figure 5:
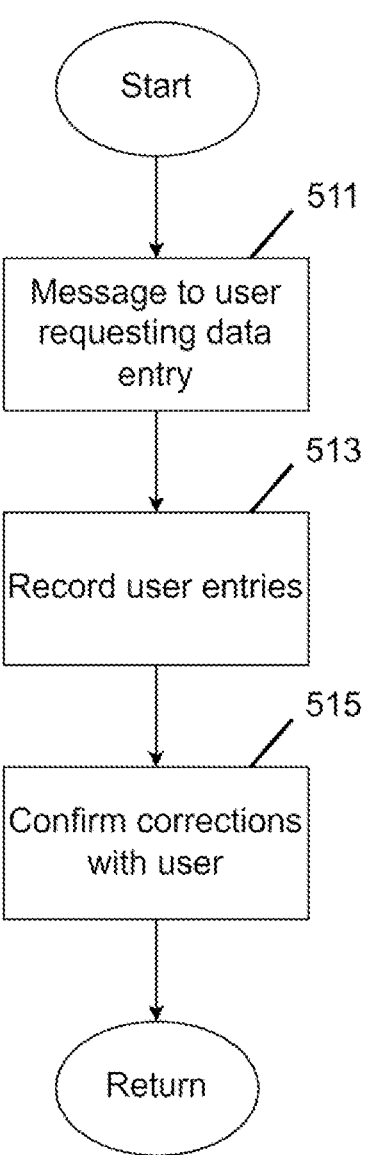
FIG. 5 is a flowchart of a process including revising an RPA bot flow by a user, in accordance with aspects of the invention.

FIG. 5 is a flowchart of an example process including revising an RPA flow by a user. In some embodiments the process performs operation of block 317 and 319 of the process of FIG. 3A. In some embodiments the process of FIG. 5 is performed by a system, for example the system of FIG. 1. In some embodiments the process is performed, at least in part, by a user compute device, for example a user compute device of FIG. 1. In some embodiments the process is performed by one or more processors programmed by program instructions.

In block 511 the process provides a message to a user requesting user input to complete an RPA flow. In some embodiments the RPA flow is for a complete flow of operations to be performed by an RPA bot. In some embodiments the user input is for operations of the RPA flow at and subsequent to a state when the RPA bot issued an exception. In some embodiments the user input is for operations only for operations at the state when the RPA bot issued the exception. In some embodiments the user input is for operations of the RPA flow estimated to be changed, for example as estimated to be changed in block 316 of the process of FIG. 3A. In some embodiments the user input is for operations of the RPA bot flow both estimated to be changed and for which carrying out of operations of other RPA bot flows did not result in successful completion of RPA bot operations. In some embodiments the message is presented on a display of a user compute device being used by the user. In some embodiments the message additionally informs the user that the user should provide an indication of the information for each field.

In block 513 the process records user operations. In some embodiments the user operation are, or include, user entries. In some embodiments the process records the user operations in a data structure associated with the RPA flow for the RPA bot. In some embodiments the process records an indication of the information of the user operations. In some embodiments the indication of the information is sufficient to allow the RPA bot to determine a location of the information to be used for the user operations.

In block 515 the process confirms corrections to the RPA form fill process with the user. In some embodiments the process presents a message on a display of the user compute device requesting that the user provide an input confirming correctness of the corrections to the RPA form fill process.

The process thereafter returns.

Figure 6:
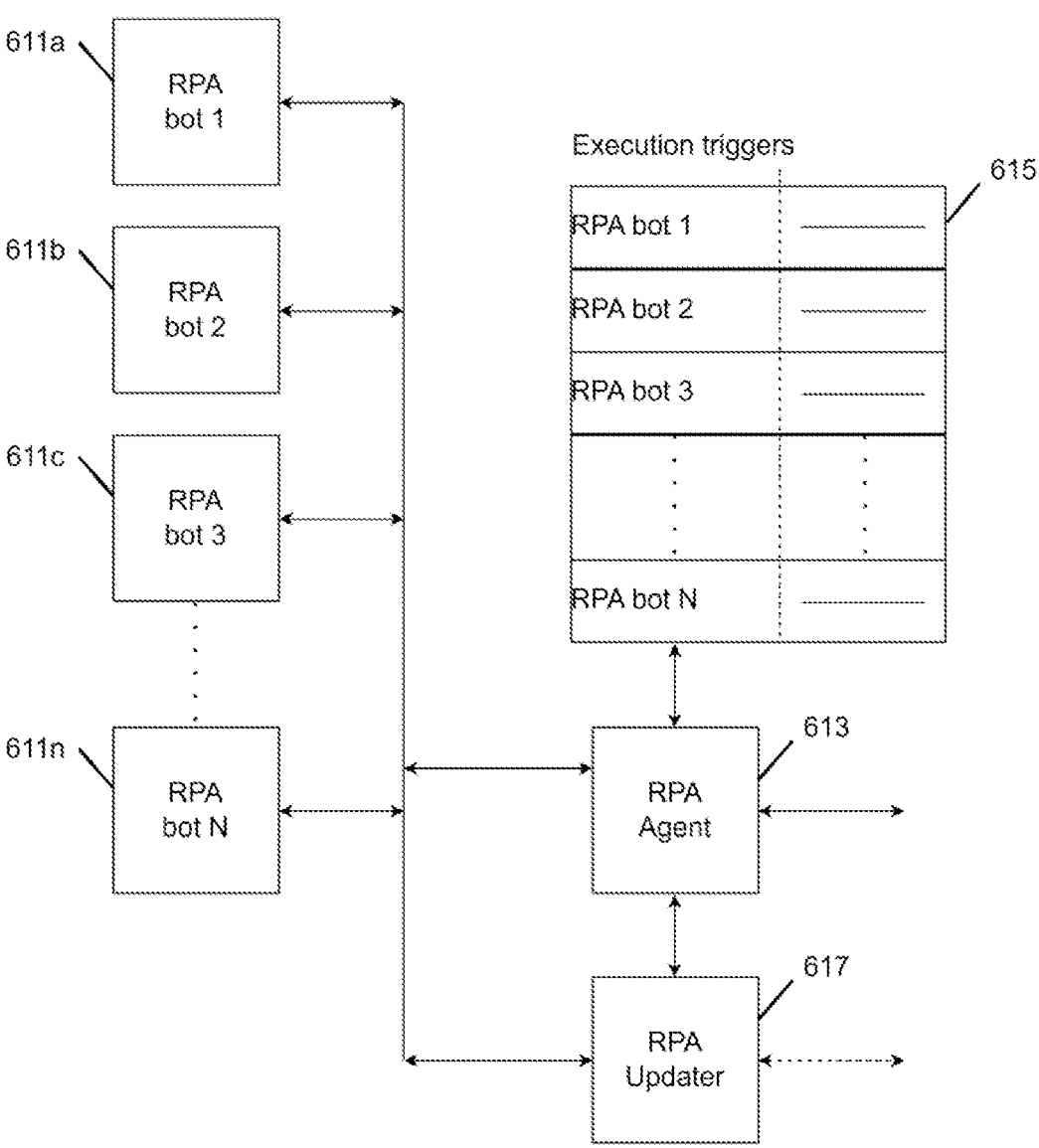
FIG. 6 is a block diagram showing components of RPA related processes, in accordance with aspects of the invention.

FIG. 6 is a block diagram showing example components of RPA related processes. In some embodiments the RPA related processes are software modules on a user compute device. In some embodiments the components provide for various of the operations of the processes of FIGS. 2-5.

The example of FIG. 6 includes a plurality of RPA bots, including a first RPA bot 611*a*, a second RPA bot 611*b*, a third RPA bot 611*c*, up to an nth RPA bot 611*n*. Each of the RPA bots are configured, for example by RPA flows defined for those bots, to provide various operations, which may include data entry, state capture, or data update functions. In some embodiments, a different RPA bot may be used for each of a plurality of different sequences of operations.

In some embodiments execution of a particular RPA bot is triggered by an RPA agent 613. The RPA agent may monitor operation of the user compute device. In some embodiments the RPA agent may read content of pages loaded by the user compute device, and compare content of the pages with triggering conditions 615 for execution of the RPA bots. In some embodiments the triggering conditions may include loading of particular software applications, and the RPA agent may perform monitoring to determine if any of the particular software applications are being loaded.

The components shown in FIG. 6 also include an RPA updater 617. In some embodiments the RPA updater may perform functions to update RPA flows of or associated with the RPA bots. In some embodiments the RPA updater may be bundled with or as part of the RPA agent. In some embodiments the RPA updater may perform operations on receipt of an exception sourced from an RPA bot, with the exception indicating that the RPA bot encountered an unexpected situation. In some embodiments the operation of the RPA updater may include providing messages for display to the user, recording of user operations (which may include user entries, updating the RPA flow of the RPA bot with the user operations, providing the updated RPA flow, for example to a server, for distribution to other user compute devices, and receiving updated RPA flows which may have been updated by other user compute devices. In some embodiments the RPA updater may perform operations relating to estimation of RPA flow tree changes, determination of other RPA bots that may have similar RPA flows, comparisons of RPA flows, and/or commanding of execution of flows from other RPA bots. In some embodiments the operation of the RPA updater may instead be performed by or as part of operations of the RPA agent.

Figure 7:
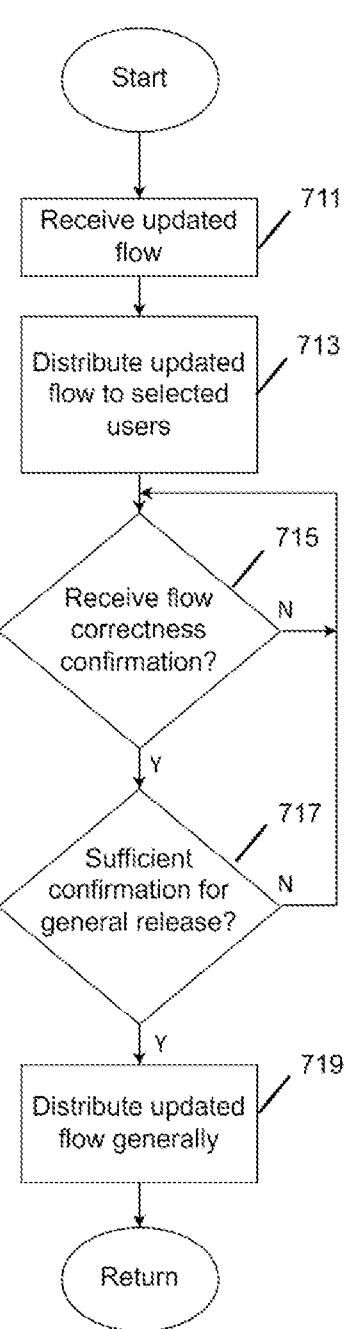
FIG. 7 is a flowchart of a process including distribution of an updated RPA flow for users, in accordance with aspects of the invention.

FIG. 7 is a flowchart of a process including distribution of an updated RPA flow for users. In some embodiments the process performs operations of block 323 of the process of FIG. 3A. In some embodiments the process of FIG. 7 is performed by a system, for example the system of FIG. 1. In some embodiments the process is performed, at least in part, by a server, for example the server 113*b* of FIG. 1. In some embodiments the process is performed by one or more processors programmed by program instructions.

In block 711 the process receives an updated RPA flow. The updated RPA flow is an RPA flow for execution by an RPA bot. The updated RPA flow may be received from a user compute device.

In block 713 the process distributes the updated RPA flow to selected users. The process may distribute the updated flow to the selected users by transmitting the updated RPA flow over a network to user compute devices of the selected users. In some embodiments the selected users are predetermined. For example, the selected users may be known or expected to be particularly knowledgeable users. In some embodiments the selected users may be selected based on a relationship to a user who updated the RPA flow. For example, the selected users may have a predetermined work relationship to the user who updated the RPA flow. In some embodiments the selected users share network access to predetermined folders, files, and/or data, with the shared folders, files, or data forming a workspace. In some embodiments the process does not distribute the updated flow to users sharing the workspace prior to receiving permission to do so. In some embodiments the permission is received from a user sharing another workspace. In some embodiments the permission is received from one or more predetermined ones of the selected users for the workspace. In some embodiments, certain predetermined users in predetermined workspaces approve the updated RPA flow before the RPA flow is shared with all users across all workspaces.

In block 715 the process determines if the process has received confirmation that the updated RPA flow is correct. The confirmation may be received by the server and from a user compute device. In some embodiments the confirmation is generated by the user compute device upon successful completion of the RPA flow by the user compute device. In some embodiments the confirmation is generated based on a user input to the user compute device that the RPA flow has completed successfully. If no confirmation has been received, the process waits for such a receipt of confirmation. If so, in block 717 the process determines if a sufficient number of user compute devices have confirmed that the updated flow is correct. The sufficient number of user compute devices may be all of the user compute devices that received the updated RPA flow in some embodiments. In other embodiments, the sufficient number of user compute devices may be a predetermined number of user compute devices that received the updated RPA flow, or a predetermined percentage of the user compute devices that received the updated RPA flow. In some embodiments the sufficient number of user compute devices is any user compute device of a particular set of user compute devices. In some embodiments the set of user compute devices is one predetermined user compute device. If an insufficient number of user compute devices have confirmed that the updated RPA flow is correct, the process goes back to block 715, and waits for further confirmation. If a sufficient number of user compute devices have confirmed correctness of the updated RPA flow, the process continues to block 719.

In block 719 the process distributes the updated RPA flow to users generally. In some embodiments the server transmits the updated RPA flow to user compute devices of users generally. In some embodiments the server distributes the updated RPA flow to users known to have the RPA bot for which the updated RPA flow applies on their user compute devices. In some embodiments the server distributes the updated RPA flow to users in a same work group or organization as the user who updated the RPA flow.

The process thereafter returns.

Figure 8:
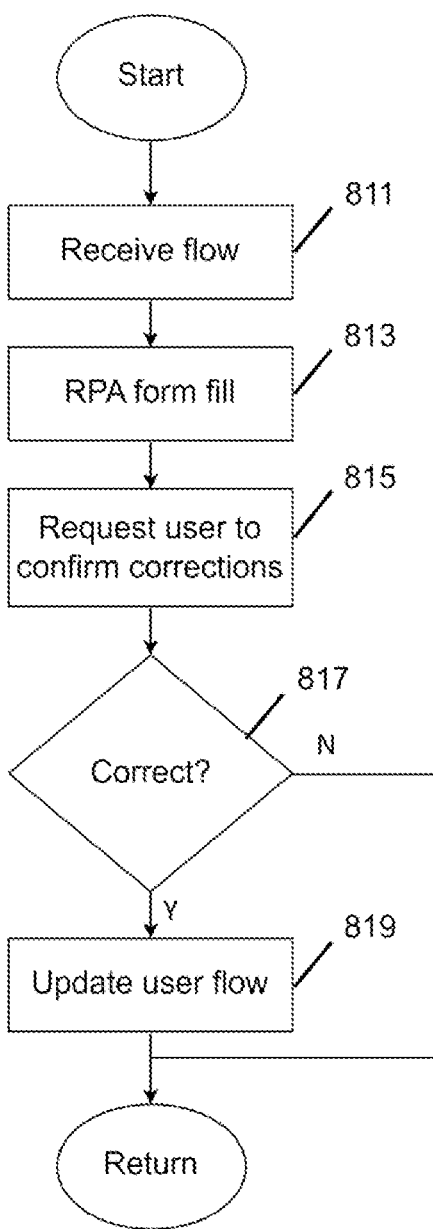
FIG. 8 is a flowchart of a process including determining if a distributed updated RPA flow for an RPA bot is correct, in accordance with aspects of the invention.

FIG. 8 is a flowchart of a process including determining if a distributed updated RPA flow for an RPA bot is correct. In some embodiments the process performs operation relating to block 715 of the process of FIG. 7. In some embodiments the process of FIG. 8 is performed by a system, for example the system of FIG. 1. In some embodiments the process is performed, at least in part, by a user compute device, for example a user compute device of FIG. 1. In some embodiments the process is performed by one or more processors programmed by program instructions.

In block 811 the process receives an updated RPA flow. The updated RPA flow may be received from a server by a user compute device. The updated RPA flow may be received as a result of operations of block 713 of the process of FIG. 7. The updated RPA flow may have been updated by the process of FIG. 5.

In block 813 an RPA bot operates using the updated RPA flow. In some embodiments, in using the updated RPA flow, the RPA bot performs operations as discussed with respect to block 311 of the process of FIG. 3 and/or the process of FIG. 4.

In block 815 the process requests that the user confirm correctness of operation of the RPA bot using the updated RPA flow. In some embodiments the process provides a message on a display of the user compute device, requesting a user input to confirm correctness of operation of the RPA bot using the updated RPA flow. In some embodiments operations of block 815 are optional, and may be replaced by the process determining that the RPA bot completed operations using the updated RPA flow without issuing an exception.

In block 817 the process determines if the updated RPA flow is correct. In some embodiments the process determines the updated RPA flow is correct if the user provided an input to the user compute device indicating that the updated RPA flow is correct. In some embodiments the process determines the updated flow is correct if the RPA bot completes operations using the updated RPA flow without issuing an exception. If the process does not determine that the updated RPA flow is correct, the process returns.

If the updated RPA flow is correct, the process modifies the RPA flow for the RPA bot to use the updated RPA flow in block 819.

The process thereafter returns.

Figure 9A:
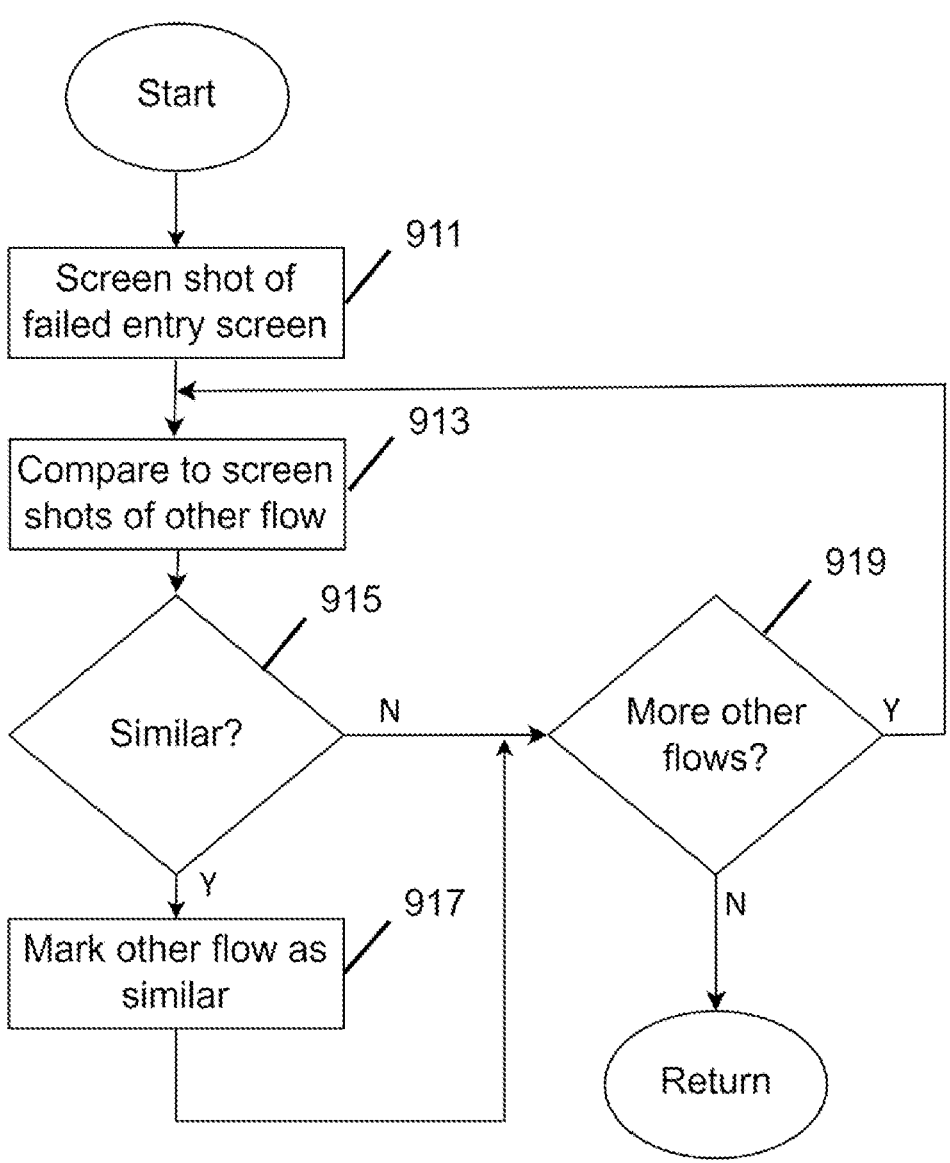
FIGS. 9A-B are flowcharts of processes for determining similar RPA bot flows, in accordance with aspects of the invention.

FIG. 9A is a flow chart of a process for determining similar RPA bot flows. In some embodiments the process of FIG. 9A is performed by a system, for example the system of FIG. 1.

In some embodiments the process is performed, at least in part, by a server, for example the server 113b of FIG. 1. In some embodiments the process is performed, at least in part, by a user compute device, for example a user compute device of FIG. 1. In some embodiments the process is performed by one or more processors programmed by program instructions. In some embodiments the process performs operations of block 349 of FIG. 3B and/or block 371 of FIG. 3C.

In block 911 the process records a screen shot of the page of the RPA bot flow that resulted in the unexpected state. In some embodiments the screen shot may only be of a window of a display or browser. For convenience, screenshots will be generally referred to, but it should be understood that the term screenshot may refer to an image of only a window instead of an entire display, unless the context indicates otherwise. In some embodiments the process may record the screen shot as part of other operations. For example, in some embodiments another process may record screen shots as part of performing RPA operations in the processes of FIGS. 3A-C, and either delete the screenshot if no unexpected state occurs or generally save the screenshot, for example for maintaining in a library of screenshots associated with RPA bot flows.

In block 913 the process compares the screenshot, or portions of the screenshot, with screenshots of another RPA bot flow. In some embodiments the process performs the comparison using image analysis. In some embodiments the process performs the comparison using a neural network, trained for example to determine if two screenshots indicate the same data entry requirements. In some embodiments the training of the neural network determines weights to be used by the neural network. As one would understand, in some embodiments the weights may be determined using a first neural network executing on one device, or multiple devices, while the neural network performing the comparison may be executing on a second device, with weights as determined through training of the first neural network. In some embodiments the neural network determines DOM elements indicated by the screenshots, and determines similarities between the DOM elements of the two screenshots.

In block 915, the process determines if operations of block 913 have determined that the screenshots are similar. If so, the process in block 917 marks the other RPA bot flow as similar to the RPA bot flow that resulted in the exception. In some embodiments the process marks the other RPA bot flow as similar, and notes the position in the other RPA bot flow, represented by the screenshot, that resulted in the determination of similarity.

After operations of block 917, or if the operations of block 915 indicate the screenshots of the RPA bot flow and the other RPA bot flow are not similar, the process continues to block 919. In block 919, the process determines if there are more other RPA bot flows to examine. If so, the process goes to block 913 to compare screenshots of a further RPA bot flow to the screenshot of the RPA bot flow that resulted in the exception. If not, the process returns.

Figure 9B:
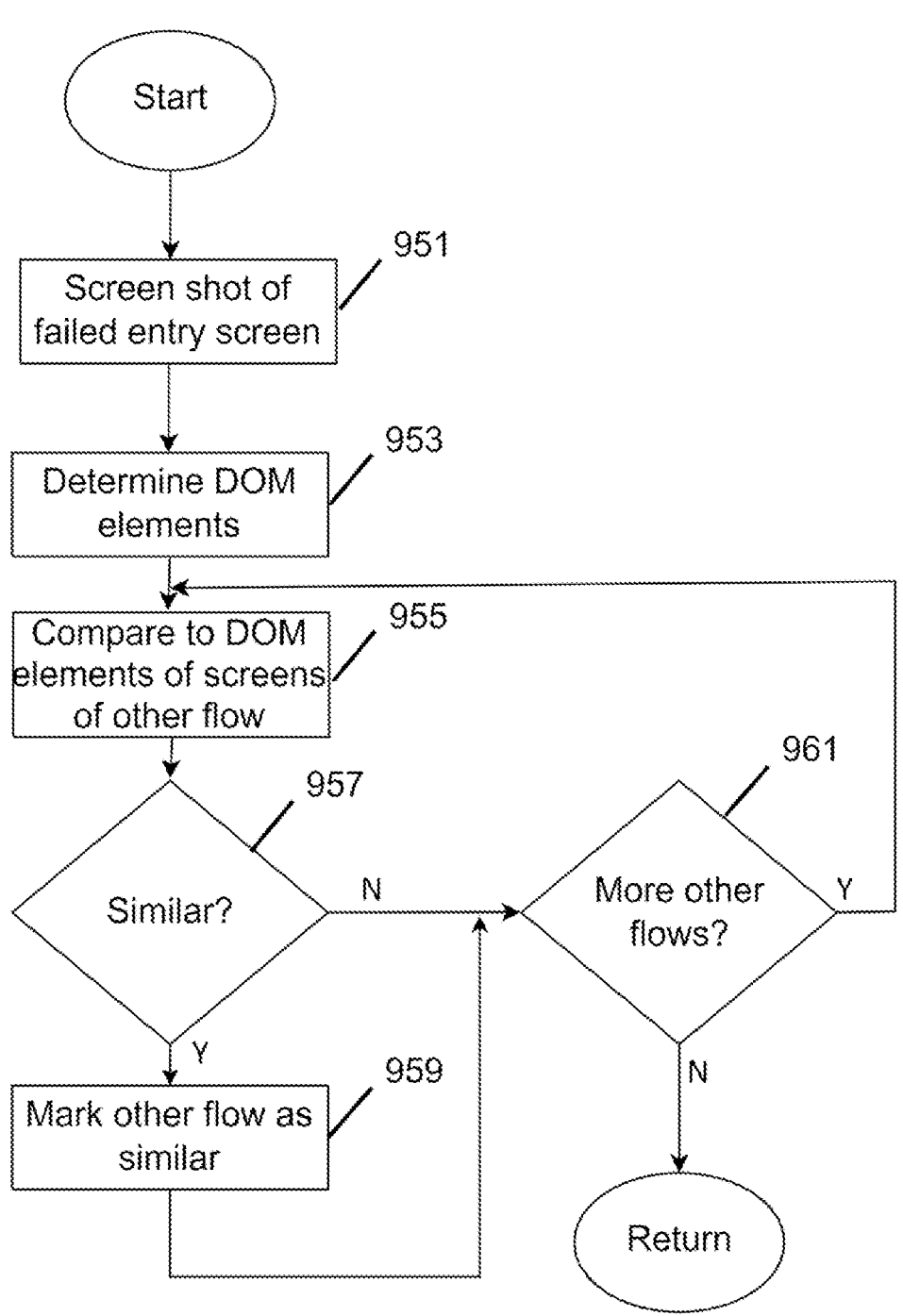

FIG. 9B is a flow chart of a further process for determining similar RPA bot flows. In some embodiments the process of FIG. 9B is performed by a system, for example the system of FIG. 1. In some embodiments the process is performed, at least in part, by a server, for example the server 113b of FIG. 1. In some embodiments the process is performed, at least in part, by a user compute device, for example a user compute device of FIG. 1. In some embodiments the process is performed by one or more processors programmed by program instructions. In some embodiments the process performs operations of block 349 of FIG. 3B and/or block 371 of FIG. 3C.

In block 951 the process records a screenshot of the page of the RPA bot flow that resulted in the unexpected state. In some embodiments the operations of block 951 are as discussed with respect to block 911 of the process of FIG. 9A.

In block 953 the process determines DOM elements indicated by the screenshot of the page of the RPA bot flow that resulted in the unexpected state. In some embodiments the process performs image analysis of the screenshot to determine the DOM elements. In some embodiments the image analysis is performed by a neural network that has been trained to identify DOM elements from screenshots. In some embodiments the training of the neural network determines weights to be used by the neural network. As one would understand, and as previously discussed, in some embodiments the weights may be determined using a first neural network executing on one device, or multiple devices. The neural network performing the comparison may be executing on a second device, with weights as determined through training of the first neural network.

In block 955 the process compares the DOM elements indicated by the screenshot of the page of the RPA bot flow that resulted in the unexpected state with DOM elements of screens of another RPA bot flow. The DOM elements of screens of the other RPA bot flow may have been derived through image analysis, for example as discussed with respect to block 953, or otherwise. In some embodiments the DOM elements of screens of multiple other RPA bot flows may be stored in a database, library, or other data structure, for example for retrieval and use in the comparison.

In block 957 the process determines if the DOM elements indicated by the screenshot of the page of the RPA bot flow that resulted in the unexpected state the DOM elements of screens of another RPA bot flow are similar. If so, the process continues to block 959. Otherwise the process goes to block 961.

In block 959 marks the other RPA bot flow as similar to the RPA bot flow that resulted in the exception. In some embodiments the process marks the other RPA bot flow as similar, and notes the position in the other RPA bot flow that resulted in the determination of similarity.

In block 961 the process determines if there are more other RPA bot flows to examine. If so, the process goes to block 955 to compare DOM elements of a further RPA bot flow to the DOM elements indicated by the screenshot of the RPA bot flow that resulted in the exception. If not, the process returns.

Although the invention has been discussed with respect to various embodiments, it should be recognized that the invention comprises the novel and non-obvious claims supported by this disclosure.

What is claimed is:

1. A method, executed by one or more processors, of updating a robotic process automation (RPA) bot flow, comprising:

receiving an indication that an RPA bot executing RPA operations, in accordance with an RPA bot flow, encountered an exception;

in response to receiving the indication that the RPA bot executing the RPA operations encountered the exception, determining further RPA operations that allow the RPA bot to successfully complete the RPA operations without any exception by iteratively, until either the RPA operations have successfully completed without any exception or a maximum level of the RPA bot flow is reached:

determining an RPA bot flow of a then-next level that is similar to an RPA bot flow at a then-current level at an operation that resulted in a failure to successfully complete, wherein a similarity between a pair of RPA bot flows is based on a determination that the pair of RPA bot flows are associated with at least one shared data entry requirement;

executing RPA operations of the determined RPA bot flow at the then-next level; and determining whether the RPA operations of the determined RPA bot flow at the then-next level have successfully completed without any exception; and in response to determining that the RPA operations of the determined RPA bot flow at the then-next level have successfully completed without any exception, updating the RPA bot flow with the further RPA operations that allow the RPA bot to successfully complete the RPA operations without any exception.

2. The method of claim 1, wherein the determined RPA bot flow at the then-next level is an RPA bot flow whose RPA operations have not yet been executed at the then-next level.

3. The method of claim 1, wherein the maximum level of the RPA bot flow is a predetermined level.

4. The method of claim 1, wherein the maximum level of the RPA bot flow is a level at which there are no RPA bot flows of the then-next level that are similar to the RPA bot flow at the then-current level at the operation that resulted in the failure to successfully complete, and wherein a similarity between a pair of RPA bot flows is based on a determination that the pair of RPA bot flows are associated with at least one shared data entry requirement.

5. The method of claim 1, wherein determining the RPA bot flow of the then-next level comprises:

commanding presentation, on a display, of a request to a user to perform data entry; and recording entries provided by the user.

6. A method, executed by one or more processors, of updating a robotic process automation (RPA) bot flow, comprising:

receiving an indication that an RPA bot executing RPA operations, in accordance with an RPA bot flow, encountered an exception;

in response to receiving the indication that the RPA bot executing the RPA operations encountered the exception, determining further RPA operations that allow the RPA bot to successfully complete the RPA operations without any exception, wherein determining the further RPA operations comprises:

determining other RPA bot flows that are similar to the RPA bot flow at an operation that resulted in a failure to successfully complete, wherein a similarity between a pair of RPA bot flows is based on a determination that the pair of RPA bot flows are associated with shared visual elements, identified using an image analysis process, between:

at least portions of display images provided as part of the other RPA bot flows; and at least a portion of a display image provided by the RPA bot flow at the operation that resulted in the failure to successfully complete;

determining portions of at least one RPA bot flow of the other RPA bot flows that allow for the successful completion of the RPA operations without any exception; and executing the RPA operations of the at least one RPA bot flow of the other RPA bot flows until the at least one RPA bot flow of the other RPA bot flows successfully completes the RPA operations without any exception; and updating the RPA bot flow with the further RPA operations that allow the RPA bot to successfully complete the RPA operations without any exception.

7. The method of claim 6, wherein the image analysis process is executed by a neural network.

8. The method of claim 7, wherein the neural network has been trained to determine when display images share data entry requirements.

9. The method of claim 6, wherein determining the other RPA bot flows comprises:

determining, by a neural network, document object model (DOM) elements indicated by:

the at least a portion of the display image provided by the RPA bot flow at the operation that resulted in the failure to successfully complete; and the at least portions of the display images provided as part of the other RPA bot flows; and determining shared data fields between the DOM elements indicated by:

the at least a portion of the display image provided by the RPA bot flow at the operation that resulted in the failure to successfully complete; and the at least portions of the display images provided as part of the other RPA bot flows.

10. The method of claim 6, wherein determining the portions of the at least one RPA bot flow of the other RPA bot flows that allow for the successful completion of the RPA operations without any exception comprises determining that the executed RPA operations are the portions of the at least one RPA bot flow of the other RPA bot flows that allow for the successful completion of the RPA operations without any exception.

11. The method of claim 10, wherein the at least one RPA bot flow of the other RPA bot flows comprises a single RPA bot flow.

12. The method of claim 10, wherein the at least one RPA bot flow of the other RPA bot flows comprises multiple RPA bot flows in the at least one RPA bot flow of the other RPA bot flows.

13. The method of claim 12, wherein determining the portions of the at least one RPA bot flow of the other RPA bot flows that allow for the successful completion of the RPA operations without any exception comprises:

executing RPA operations of a first RPA bot flow of the other RPA bot flows until the RPA operations encounter any exception;

determining yet other RPA bot flows that are similar to the first RPA bot flow of the other RPA bot flows at an operation that resulted in the failure to successfully complete, wherein a similarity between a pair of RPA bot flows is based on a determination that the pair of RPA bot flows are associated with shared visual elements, identified using the image analysis process; and executing RPA operations of a first RPA bot flow of the yet other RPA bot flows.

14. A system for updating a robotic process automation (RPA) bot flow, comprising:

a network interface;

a memory storing instructions; and one or more processors configured to communicate data with the network interface and the memory, the one or more processors further configured to execute the instructions to perform a process comprising:

receiving, using the network interface, an indication that an RPA bot executing RPA operations, in accordance with a first RPA bot flow, encountered an exception;

in response to receiving the indication that the RPA bot executing the RPA operations encountered the exception, determining further RPA operations that allow the RPA bot to successfully complete RPA operations without any exception, wherein determining the further RPA operations comprises:

determining a second RPA bot flow at an operation in the first RPA bot flow that resulted in a failure to successfully complete, wherein the second RPA bot flow is determined based on shared visual elements, identified using an image analysis process, between:

at least a portion of a display image generated during an execution of the second RPA bot flow; and at least a portion of a display image generated during an execution of the first RPA bot flow at the operation in the first RPA bot flow that resulted in the failure to successfully complete;

determining at least one portion of the second RPA bot flow that allows for the successful completion of the RPA operations without any exception; and executing the RPA operations of the second RPA bot flow until the second RPA bot flow successfully completes the RPA operations without any exception; and updating the first RPA bot flow with the further RPA operations that allow the RPA bot to successfully complete the RPA operations without any exception.

15. The system of claim 14, wherein the image analysis process is executed by a neural network.

16. The system of claim 15, wherein the neural network has been trained to determine when display images share data entry requirements.

17. The system of claim 14, wherein determining the second RPA bot flow comprises:

determining, by a neural network, document object model (DOM) elements indicated by:

the at least a portion of the display image generated during the execution of the first RPA bot flow at the operation in the first RPA bot flow that resulted in the failure to successfully complete; and the at least a portion of the display image generated during the execution of the second RPA bot flow; and determining shared data fields between the DOM elements indicated by:

the at least a portion of the display image generated during the execution of the first RPA bot flow at the operation in the first RPA bot flow that resulted in the failure to successfully complete; and the at least a portion of the display image generated during the execution of the second RPA bot flow.

18. The system of claim 14, wherein determining the at least one portion of the second RPA bot flow that allows for the successful completion of the RPA operations without any exception comprises determining that the executed RPA operations are the at least one portion of the second RPA bot flow that allow for the successful completion of the RPA operations without any exception.

19. The system of claim 18, wherein the at least one portion of the second RPA bot flow comprises multiple portions in the at least one portion of the second RPA bot flow.

20. The system of claim 19, wherein determining the at least one portion of the second RPA bot flow that allows for the successful completion of the RPA operations without any exception comprises:

executing RPA operations of a first portion of the second RPA bot flow until the RPA operations encounter any exception;

determining a second portion of the second RPA bot flow that is similar to the first portion of the second RPA bot flow at an operation that resulted in the failure to successfully complete; and executing RPA operations of the second portion of the second RPA bot flow.

* * * * *